(12) United States Patent
Hsu

(10) Patent No.: US 11,246,436 B2
(45) Date of Patent: Feb. 15, 2022

(54) TRAINING CHOPSTICKS

(71) Applicant: Fred Hsu, Port Washington, NY (US)

(72) Inventor: Fred Hsu, Port Washington, NY (US)

( * ) Notice: Subject to any disclaimer, the term of this patent is extended or adjusted under 35 U.S.C. 154(b) by 246 days.

(21) Appl. No.: 16/731,037

(22) Filed: Dec. 31, 2019

(65) Prior Publication Data

US 2021/0196065 A1 Jul. 1, 2021

(51) Int. Cl.
  *A47G 21/06* (2006.01)
  *G09B 19/24* (2006.01)

(52) U.S. Cl.
  CPC ............ *A47G 21/103* (2013.01); *G09B 19/24* (2013.01)

(58) Field of Classification Search
  CPC .............................. G09B 19/24; A47G 21/103
  See application file for complete search history.

(56) References Cited

U.S. PATENT DOCUMENTS

| | | | |
|---|---|---|---|
| 5,277,464 A | 1/1994 | Okun | |
| 6,749,239 B2* | 6/2004 | Choi | A47G 21/103 |
| | | | 294/218 |
| 8,235,440 B2 | 8/2012 | Park | |
| 8,562,054 B2 | 10/2013 | Keller | |
| 9,155,411 B2* | 10/2015 | Woo | A47G 21/103 |
| 2007/0187962 A1* | 8/2007 | Park | A47G 21/103 |
| | | | 294/218 |
| 2011/0020773 A1* | 1/2011 | Sung | G09B 19/24 |
| | | | 434/127 |
| 2012/0133167 A1 | 5/2012 | Woo | |
| 2014/0265402 A1 | 9/2014 | Pecoraro | |

FOREIGN PATENT DOCUMENTS

| | | |
|---|---|---|
| CN | 101991331 A | 3/2011 |
| CN | 104257228 A | 1/2015 |
| GB | 2234425 A | 2/1991 |
| JP | H10137101 A | 5/1998 |
| JP | H10228234 A | 8/1998 |
| JP | 3078843 U | 7/2001 |
| JP | 3089628 U | 10/2002 |
| JP | 3133200 U | 7/2007 |
| JP | 6366159 B2 | 8/2018 |
| WO | 2013181822 A1 | 12/2013 |

\* cited by examiner

*Primary Examiner* — Robert J Utama

(57) ABSTRACT

Training chopsticks are designed to guide beginners and lifelong users alike to adopt a proper chopstick grip, allowing learners to extend chopstick tips wide apart. They allow learners to focus first on mastering the twirling of chopsticks between the closed posture to the wide-open posture, based on principles of the planetary gear train, without having to simultaneously learn to secure chopsticks using the required thumb pose. Such thumb pose can be mastered later as a second step. Furthermore, a variation of training chopsticks provides an elevated thumb rest to accommodate learners suffering from anatomical limitations. As a result, a learner can wield these training chopsticks to embrace large food items with ease, manipulate these large items with dexterity and finesse in the same way she can small items, and generate enough compression force to hold all items firmly between training chopsticks.

10 Claims, 17 Drawing Sheets

FIG. 8T2

TRAINING CHOPSTICKS

CROSS-REFERENCE TO RELATED APPLICATION

This application and the present disclosure is built partially on the discoveries of finger-chopstick dynamics that I have disclosed in my U.S. patent application entitled "Ergonomic Chopsticks", assigned Ser. No. 16/695,029, filed Nov. 25, 2019, which is incorporated by reference herein in its entirety, and is hereafter referred to as the '029 application. Referenced concepts and principles from the '029 application include: the standard grip, the alternating motion of the standard grip, the closed posture, the wide-open posture, twirling movements of fingers in manipulating chopsticks, rolls/extensions/flexions of chopsticks with respect to various chopstick axes, mechanical advantages of the planetary gear train as applied to finger-chopstick dynamics, and unrestricted chopsticks.

TECHNICAL FIELD OF THE INVENTION

Various embodiments of the present disclosure relate to chopsticks, and in particular to training chopsticks that guide beginners, lifelong users, and those with anatomical limitations alike in learning the standard grip and its finger movement, enabling users to extend the tips of the chopsticks wide apart to embrace a food item, to manipulate chopsticks with dexterity, and to generate enough compression force to hold the item firmly between tips, with ease.

BACKGROUND OF THE INVENTION

Unlike forks and spoons, chopsticks are not intuitive to use. There are many ways for a human hand to grip a pair of chopsticks, and to wield them such that tips of these chopsticks can be made to grasp and to release food items. However, only one grip is generally considered the standard way to manipulate chopsticks, based on ergonomic considerations. This standard grip is not a single static configuration of fingers and chopsticks, but a fluid and concerted motion of fingers pushing, pulling and rolling these chopsticks, moving them back and forth between two ends of a range of configurations.

FIG. 2W illustrates the wide-open end of this range, with the tips of the chopsticks spread apart as wide as the length of the thumb. FIG. 2C illustrates the closed end of this range, where tips touch. In order to manipulate the two chopsticks in between these two ends, the hand alternates between wide-open posture (FIG. 2W) and the closed posture (FIG. 2C). At the wide-open posture, the index finger and the middle finger are uncurled. At the closed posture, these two fingers are curled (FIG. 2C).

Before the '029 application, the full range of finger movements were not well-understood nor well-studied. Previous literature and published training chopsticks focused only on establishing a proper initial, closed posture, as illustrated in FIG. 2C. Previous literature ignored the wide-open posture and finger shifts from the closed posture to it. As a result, published training chopsticks in general did not work well in actual eating situations.

My '029 application disclosed not only ergonomic chopsticks, but also research findings that led to the creation of these ergonomic chopsticks. The research included extensive reviews of photos and slow-motion videos of proficient users wielding chopsticks with the standard grip. I find that the alternating motion between the wide-open posture and the closed posture not only changes the pitch angle 423 of top chopstick 420 (FIG. 9W and FIG. 9C) around its lateral axis 26, but also rolls it back and forth, around its longitudinal axis 27, as can be revealed by following movements of striped mark 23 at the rear end of top chopstick 420. This roll is a key element of how chopsticks actually work, and explains the puzzling popularity of square chopsticks over round ones. The edges from a square chopstick allow the thumb, the index finger, and the middle finger to maintain a firm grip on the chopstick for the roll, without having to assert extensive pressure throughout the entire alternating motion.

Whereas previously-published literatures on chopsticks treated the thumb as a static fulcrum for the top chopstick, in a third-class Archimedean lever configuration, the reality is more nuanced. The static fulcrum narrative did not account for the roll I have discovered while observing actual usages of chopsticks.

What really happens is that three fingers—thumb, index and middle—twirl top chopstick 420 back and forth, simultaneously around two axes, the lateral axis 26 and the longitudinal axis 27 (FIG. 9W). This twirling motion is similar to techniques used in drumstick twirling and pen twirling. There isn't a static fulcrum, and the chopstick does not rotate only on one plane. Furthermore, the thumb is not a passive participant in this motion, despite its seemingly static stance. When moving from the wide-open posture shown in FIG. 9W to the closed posture shown in FIG. 9C, the thumb twirls top chopstick 420, in opposition to the index finger and the middle finger, to generate roll 29, as the index finger twirls tip 21 downward to achieve flexion 28. This finger-chopstick dynamics resembles that of a planetary gear train, with the top chopstick as the sun gear, and the three fingers as planet gears, shown in FIG. 10. The outer gear ring is omitted in the illustration of the mechanical gear train.

The dynamics and mechanical advantages of chopstick wielding can be better described in terms of gear trains. Fingers mesh with surfaces of a chopstick, and twirl the chopstick to impart torque without having to drag sensitive finger skin repeatedly against any surface. Note, for instance, where top chopstick 420 intersects the thumbnail at the wide-open posture in FIG. 9W, and compare this presumed static fulcrum to the location of the same intersection in the closed posture in FIG. 9C. The intersection point has shifted downwards significantly to reveal the fact that top chopstick 420 has been rolled in a twirling motion. This twirling motion is a central component of the standard grip. It explains why the seemingly lever-like motion does not cause chopsticks to repeatedly rub against sensitive finger skin. It enables the human hand to exercise dexterity to achieve the full range of finger configurations between the two postures. This dexterity in turns allows the hand to manipulate both small and large food items, with either miniscule or significant clutching forces as situations call for.

These ergonomic insights inspired the ergonomic chopsticks disclosed in my '029 application. The ergonomic chopsticks work in exactly the same way as plain chopsticks do, but in addition provide tactile feedback via ergonomic nuggets to help users learn and adopt the standard grip. The ergonomic chopsticks allow users to wield them in the same way as they wield plain chopsticks. That is, a user of the standard grip can achieve the full range of motions, with said ergonomic chopsticks, as they can with a pair of plain chopsticks. I termed this equivalency as "unrestricted chopsticks". The unrestricted equivalency distinguishes ergonomic chopsticks from training chopsticks from previously-published literatures that examine only a fraction of the full alternating motion, incognizant of the nuances of how the human hand actually manipulates chopsticks using gear train principles.

During testing phases of various prototypes of ergonomic chopsticks, a majority of beginners learned to twirl chopsticks using the standard grip quickly. A majority of lifelong users who have been using alternative grips were able to switch to the standard grip as well. But I soon came to realize that not all test subjects responded well to ergonomic chopsticks. Further research revealed that users who were unable to use ergonomic chopsticks fell into two group.

The first group finds it difficult to learn to twirl chopsticks, and simultaneously learn to use the thumb to secure both chopsticks against the rest of fingers and the purlicue. Either task is already difficult to learn by itself. When both tasks have to be learned at the same time, then a user is unable to make progress in either tasks. One reason for this difficulty has to do with the unnatural pose of the thumb required by the standard grip.

FIG. 4A illustrates one thumb pose that people are able to perform instinctively. It is the thumbs-up gesture. The thumb is extended upward, with its two segments straightened to align with the back of the hand. FIG. 4B illustrates another pose that people can easily perform. It is the closed-fist gesture. The thumb is curled, with its two segments flexed (bent) inward.

Unfortunately for the first-time chopstick user, what is needed for the standard grip is the unnatural thumb pose shown in FIG. 4C. This pose requires that the base segment of the thumb be flexed inward, while the tip segment of the thumb be extended outward.

As reported in details in my '029 application, the thumb is the only finger pressing both chopsticks towards the palm, against the index finger, the middle finger, the ring finger, and the purlicue. FIG. 5W and FIG. 5C illustrate how the thumb secures both chopsticks, for the wide-open posture and the closed posture, respectively. The pose of the thumb in these figures is difficult for most people to learn, because humans do not instinctively know how to put the thumb into this pose, and hold it for a long time. When a beginner focuses on this unnatural thumb pose, to secure both chopsticks with the thumb, the index finger, the middle finger, the ring finger and the purlicue, then the beginner is unable to command these same fingers to twirl, for instance, the top chopstick. If the beginner focuses instead on commanding fingers to twirl the top chopstick, then these same fingers lose their secure hold on both chopsticks, as the unattended thumb reverts back towards a natural state where both of its segments straighten or bend together. As a result, both chopsticks are pushed out of position by fingers that try to twirl them.

The second group of users experience the same problems as the first group, the inexperience of the hand at juggling two tasks (twirling and securing chopsticks). But their situation is exacerbated by anatomical limitations of their hand, due to injuries or congenital conditions. These users are physically unable to make the thumb pose shown in FIG. 4C. Their finger anatomy does not allow them to achieve this thumb posture.

FIG. 11W and FIG. 11C show what happens when a user is unable to completely extend the tip segment of the thumb, while flexing the base segment of the thumb. The arched thumb is unable to keep the bottom chopstick from sliding out of the standard grip position. In fact, the angle of the arch constantly nudges the bottom chopstick out of position. The bending of the tip segment of the thumb makes it hard for the tip of the thumb to properly grip the top chopstick, thus hampering the rolling of the top chopstick from the wide-open posture in FIG. 11W to the closed posture in FIG. 11C. Compare these illustrations to those shown in FIG. 5W and FIG. 5C where proper thumb pose is applied, to see how a small difference in thumb pose affects the entire standard grip motion. For the second group of users, no amount of practice will allow them to wield plain chopsticks properly using the standard grip.

Ergonomic chopsticks from the '029 application are designed based on the assumption that all users have the same finger flexibility and dexterity. But the reality is that some people are unable to flex and extend the thumb in the way required by the standard grip. The first group of users require training accommodations to allow them to learn the twirling motion, without having to simultaneously learn to secure chopsticks. The second group of users require permanent assistance, to cope with their anatomical limitations.

Various embodiments of the present disclosure address the above-mentioned issues experienced by two groups of chopstick users. Some design considerations distinguish the present disclosure from previously-published literatures and my own '029 application. Firstly, previous literatures are oblivious to the gear train principles of chopstick twirling, as disclosed in the '029 application. In contrast, this disclosure is based on the gear train principles. Secondly, previous literatures and my own '029 application are unaware of initial or anatomical limitations of some users in extending and flexing the thumb, as disclosed here. In contrast, the present disclosure is designed specifically to overcome said hardship.

Inspirations for the present disclosure include:
1. Full range of postures from closed to wide-open
2. Proper tension force on chopsticks
3. Proper compression force on chopsticks
4. Extension and flexion of the top chopstick around its lateral axis
5. Roll of the top chopstick around its longitudinal axis
6. Finger-chopstick dynamics of the standard grip motion
7. Mechanical advantages of the planetary gear train
8. Unnatural thumb pose required to secure both chopsticks at the same time
9. Inability of some users in learning to twirl and to secure chopsticks at the same time
10. Inability of some users in achieving the right thumb pose, due to anatomical limitations

BRIEF SUMMARY OF THE INVENTION

As stated earlier, chopsticks are not intuitive to use. Many beginners manage to quickly find simpler but suboptimal grips that allow them to eat with chopsticks. Some find themselves stuck in their own alternative grips with a limited range of motion, without much tension or compression force. This issue is not limited to adult beginners; a large percentage of lifetime chopstick users in Asia never venture out of various alternative grips adopted in childhood.

My '029 application disclosed principles of planetary gear train that govern how chopsticks actually work. It introduced ergonomic chopsticks to assist all users in learning the standard grip and its full range of finger motions, in exactly the same way that proficient users wield plain chopsticks, and with the same power and dexterity. I called both plain and ergonomic chopsticks "unrestricted" chopsticks, because in the hand of a learned user, they are both unrestricted in correctness, range, power and dexterity. They are unrestricted, compared to previously-published chopstick training devices, which invariably restrict many or all of these factors with respect to the standard grip: the correctness of the grip, the correctness of the twirling motion, the range of finger motions, the power generated by proper mechanical advantage, and the dexterity of both chopsticks.

As discussed in the background section, the present disclosure addresses two groups of users that require additional assistance, beyond the reach of ergonomic chopsticks. This training assistance is provided at a small cost. Various embodiment of training chopsticks discussed in this disclosure are not 100% unrestricted chopsticks. They compromise in the range of finger motions, in order to provide assistance needed by these two groups of users. Nevertheless, these training chopsticks are still unrestricted with respect to the correctness of the standard grip, the correctness of the twirling motion, the power generated, and the dexterity enabled. Compared to previously-published chopstick training devices that ignore planetary gear train principles, training chopsticks disclosed here provide a better approximation of the true chopstick experience.

The first embodiment of the present disclosure is shown in FIG. 6W and FIG. 6C. It is designed to train the first group of users who are unable to twirl and secure chopsticks at the same time. A plain, square chopstick is used as the bottom chopstick. A coupling bar formed by piano wire is fixedly attached to the bottom chopstick, extending upward and ending in a head shaped as a C-hook. The top chopstick is a plain, square chopstick with a circumferential groove carved into it, to receive the C-hook head. The C-hook and the groove are shaped such that the top chopstick is able to roll around its longitudinal axis for 90 degrees, and able to pitch up to extend tips of chopsticks apart, or to pitch down to bring tips of chopsticks together. The coupling bar is detachable from both top chopstick and bottom chopstick, as shown in FIG. 7. Details of the groove are shown in FIG. 8R1, FIG. 8R2, FIG. 8T1, FIG. 8T2, FIG. 8L, and FIG. 8B.

Some previously publishes devices also couple two chopsticks together. These usually provide a hinge with a rotation axis that runs laterally to the top chopstick's longitudinal axis, to emulate the perceived function of the top chopstick as a third-class Archimedean lever. A typical example is found in US 2012/0133167 A1 by Chat-Ming Woo, published May 31, 2012. While the top chopstick can change its pitch angle using the hinge as a fixed pivot, it can no longer roll as required by planetary gear train principles of chopstick twirling.

Unlike these previous devices, the present disclosure does not emulate a third-class Archimedean lever. The C-hook in the first embodiment is shaped around the circumference of the top chopstick, to fit the circumferential groove. The primary movement enabled by this arrangement is the roll of the top chopstick. This roll is evident in FIG. 1W, showing a hand holding training chopsticks in the wide-open posture of the standard grip, and in FIG. 1C, showing the closed posture of the standard grip. The striped marks at the rear of the top chopstick indicates the 90-degree roll of the top chopstick, between these two postures. The groove is shaped such that when the top chopstick is rolled by the curling of index and middle fingers towards the closed posture (FIG. 1C), the C-hook forces the top chopstick to pitch down. When the top chopstick is rolled by the extension of index and middle fingers towards the wide-open posture (FIG. 1W), the C-hook forces the top chopstick to pitch up. In fact, a learner can learn and master chopstick twirling by simply following how the top chopstick moves.

The end result is that these training chopsticks allow a learner to practice twirling the top chopstick, in the same way they eventually will, with a pair of plain chopsticks. FIG. 2W and FIG. 2C show a pair of plain chopsticks being wielded in a hand using the standard grip. These two representative drawings are created after extensive reviews of photos and slow-motion videos of proficient users wielding chopsticks with the standard grip. Compare these to FIG. 1W and FIG. 1C to confirm that training chopsticks are operated exactly like plain chopsticks.

The first embodiment allows a learner to securely hold both chopsticks, without having to consciously maintain the unnatural thumb pose shown in FIG. 4C at all times. The coupling bar keeps the two chopsticks separated at the correct distance, per standard grip, freeing the mind to focus on moving fingers to twirl the top chopstick. At the same time, the arrangement forces the thumb to extend its tip segment, and flex its base segment, to reach across the length of the coupling bar, in order to grip and manipulate the top chopstick, together with the index finger and the middle finger (FIG. 1W and FIG. 1C). Over time this arrangement trains the mind to learn required motor skills to perform this unnatural thumb pose. In addition, the coupling bar is angled to serve as a guide for the thumb, as aid for initial placement. The C-hook couples with the groove immediately behind the thumbnail. The coupled top chopstick enforces proper finger positions during use, as it cannot be comfortably operated when any of the manipulating fingers deviate from its correct placement.

The cost of this training assistance is a compromise in the range of chopstick movements. To securely couple the two chopsticks together, the coupling bar is fixedly attached to the bottom chopstick, preventing the bottom chopstick from performing any rolls around its longitudinal axis. Thus, the bottom chopstick remains static, and cannot contribute, in the hand of a proficient user, to widening of the distance between the two tips of chopsticks as discussed in the '029 application. In addition, the design of the C-hook and the groove places a limit on the pitch angle of the top chopstick, compared to what can be done with uncoupled ergonomic chopsticks as illustrated in the '029 application. This results in a reduced distance between tips of training chopsticks, spanning only the width of three Italian sausages, compared to that of ergonomic chopsticks, easily spanning the width of four Italian sausages.

The second embodiment of the present disclosure is shown in FIG. 12. It is designed to enable the second group of users with anatomical limitations, so that they too can wield chopsticks with the standard grip. These training chopsticks are derived from the first embodiment, with a minor change—the coupling bar is slightly shortened. In addition, an elevated thumb rest is fixedly attached to the bottom chopstick.

FIG. 13W and FIG. 13C illustrate how the second embodiment allows the second group of users to operate chopsticks using the standard grip, with a non-standard thumb pose similar to that shown in FIG. 4B, where both segments of the thumb bend inward. The elevated thumb rest meets the arch of the thumb, allowing even this non-standard thumb pose to hold the bottom chopstick securely.

The arched thumb covers less distance between the tip of the thumb and the base of the thumb, compared to the standard but unnatural thumb pose shown in FIG. 4C. Thus, the coupling bar is shortened, to allow the arched thumb to reach the top chopstick and to manipulate it firmly, with the index finger and the middle finger. This assistance is clarified when FIG. 13W is compared to FIG. 11W, and FIG. 13C is compared to FIG. 11C. The shortened coupling bar and the elevated thumb rest are more clearly shown in rear views, illustrated in FIG. 14W and FIG. 14C. These demonstrate that a user from the second group can now twirl the top chopstick, effecting both rolls and pitch angle changes.

Some previously publishes devices also provide thumb guides and thumb molds. These are usually designed to teach and enforce a correct initial (closed) posture, according to the standard grip. An example is CN 101991331 A by Chat-Ming Woo, published Mar. 30, 2011. My '029 application discusses how these thumb molds prevent the bottom chopstick from rolling, and how they do not teach proper twirling of the bottom chopstick. The bottom chopstick in this disclosure also remains immobile, and thus unrollable. However, the second embodiment is distinguished by factors that include: not being static guides nor molds shaped only for the closed posture, the high elevation of the rest to specifically cope with anatomical limitations of the thumb, the parsimonious use of materials for the thumb rest, and the use of this rest together with the C-hook coupling bar.

This disclosure introduces insights into why some users find it hard to wield chopsticks with the thumb pose required by the standard grip. The present disclosure addresses this exact issue. It also honors ergonomic insights disclosed in the '029 application. These factors distinguish training chopsticks in this disclosure, from training chopsticks in previously-published literature which generally fall into one of these camps:
  1. Eschew the standard grip altogether—two sticks are connected somehow, so that users can wield them like tweezers, tongs or scissors. These do not teach the standard grip nor its finger dynamics. They are not really chopsticks at all.
  2. Avoid having to learn the finger dynamics of the standard grip—finger hoops and/or hinge-based levers are provided, such that users can affect the appearance of the standard grip, without having to learn to hold chopsticks securely nor twirl them with fingers. These teach parts of the standard grip look, but not its finger dynamics.
  3. Focused only on the initial finger placement—chopsticks are deformed, carved, or adorned with tabs or spacers, to force users to keep fingers in the same static locations for the closed posture as shown in FIG. 2C, throughout the entire alternating motion. These are designed without the insight that the standard grip operates on principles of the planetary gear train. These devices hinder chopstick rolls, teach incorrect finger dynamics, weaken mechanical advantages, and generally restrain fingers from achieving the wide-open posture as shown in FIG. 2W.

In comparison, training chopsticks in the present disclosure allow fingers to achieve some or all of these:
  1. Find the right, everchanging positions on chopsticks, throughout the alternating motion.
  2. Learn to twirl the top chopstick by simply following its programmed movements.
  3. Twirl the top chopstick in exactly the same way as they would plain chopsticks.
  4. Secure the bottom chopstick simply as a byproduct of twirling the top chopstick, without explicitly focusing on extending and flexing segments of the thumb.
  5. Learn to secure the bottom chopstick per standard grip, after mastering twirling.
  6. Leverage principles of the planetary gear train in wielding chopsticks.

BRIEF DESCRIPTION OF THE DRAWINGS

FIG. 8R1 is a close-up view of the right face of the top chopstick from FIG. 7, showing the geometry and the slightly-spiral nature of the groove.

FIG. 8R2 is the same right face view as FIG. 8R1, with the C-hook head fitted into the groove, at the closed posture, showing the tip of the C-hook coming to a stop, abutting one end of the groove.

FIG. 8T1 is a close-up view of the top face of the top chopstick from FIG. 7, showing the geometry and the slightly-spiral nature of the groove.

FIG. 8T2 is the same top face view as FIG. 8T1, with the C-hook head fitted into the groove, at the wide-open posture, showing the tip of the C-hook coming to a stop, abutting one end of the groove.

REFERENCE NUMERALS

Figure 1W:
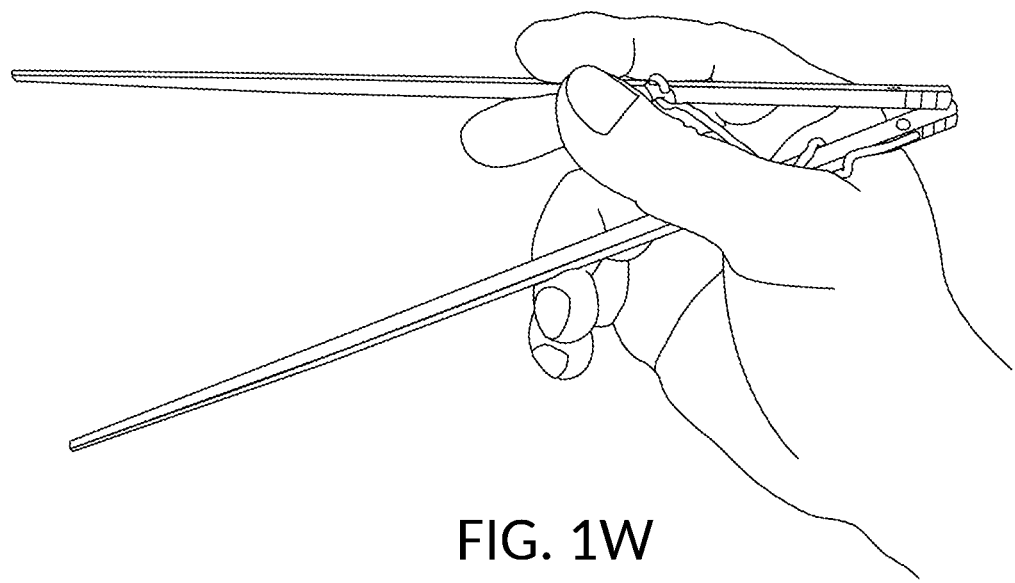
FIG. 1W is a view of a right hand holding the first embodiment of the present disclosure, training chopsticks, at the wide-open end of the standard grip and alternating motion, where tips of chopsticks are spread apart wider than the width of the palm.

It is noted that like parts are designated by like reference numerals throughout the accompanying drawings. A list of numbered parts is presented below:

20. Plain top chopstick
21. Tip of top chopstick
22. Rear end of top chopstick
23. Striped mark at the rear end of top chopstick, for illustration purposes only
24. Extension of top chopstick around lateral axis 26 to move tip 21 away from tip 31
25. Roll of top chopstick around longitudinal axis 27 top move tip 21 away from tip 31
26. Lateral axis of top chopstick
27. Longitudinal axis of top chopstick
28. Flexion of top chopstick around lateral axis 26 to bring tip 21 towards tip 31
29. Roll of top chopstick around longitudinal axis 27 to bring tip 21 towards tip 31
30. Plain bottom chopstick
31. Tip of bottom chopstick
32. Rear end of bottom chopstick
33. Striped mark at the rear end of bottom chopstick, for illustration purposes only
75. First ergonomic nugget portion
76. Second ergonomic nugget portion
100t. Thumb of a right hand
100i. Index finger of a right hand
100m. Middle finger of a right hand
100r. Ring finger of a right hand
100p. Purlicue of a right hand
111. Tip segment of a finger
111t. Tip segment of the thumb
111i. Tip segment of the index finger
112. Center segment of a finger
113. Base segment of a finger
113t. Base segment of the thumb
114. Distal knuckle between the tip segment and the center segment of a finger
114m. Distal knuckle of the middle finger 114r. Distal knuckle of the ring finger
115. Interphalangeal joint (IP joint) of the thumb
115e. Extended IP joint of the thumb, straightening the tip of the thumb outward
115f. Flexed IP joint of the thumb, bending the tip of the thumb inward
116. Metacarpophalangeal joint (MP joint) of the thumb
116e. Extended MP joint of the thumb, straightening the base of the thumb outward
116f. Flexed MP joint of the thumb, bending the base of the thumb inward
117. The palm of the hand
211t. Planet gear representing the thumb operating on top chopstick
211i. Planet gear representing the index finger operating on top chopstick
214m. Planet gear representing the middle finger operating on top chopstick
220. Sun gear representing top chopstick in a planetary gear train
241. Right face of top chopstick
242. Top face of top chopstick
243. Left face of top chopstick
244. Bottom face of top chopstick
351. Right face of bottom chopstick 30
352. Top face of bottom chopstick 30
353. Left face of bottom chopstick 30
354. Bottom face of bottom chopstick 30
410. Coupling bar with a C-hook head of the first embodiment of training chopsticks
411. C-hook head of the coupling bar
412. Tip of the C-hook
413. Root of the C-hook
415. Neck of the coupling bar
417. Body of the coupling bar
419. Tail of the coupling bar
420. Top chopstick of the first embodiment of training chopsticks
423. Pitch angle between top chopstick 420 and bottom chopstick 430
430. Bottom chopstick of the first embodiment of training chopsticks
440. Groove on the top chopstick for receiving the C-hook
452. End of the groove as a bumper for the tip of the C-hook at the closed posture
453. Wall of the groove as a bumper for the root of the C-hook at the closed posture
462. Wall of the groove as a bumper for the tip of the C-hook at the wide-open posture
463. End of the groove as a bumper for the root of the C-hook at the wide-open posture
510. Shortened coupling bar—second embodiment of training chopsticks
515. Shortened neck of the coupling bar—second embodiment
530. Bottom chopstick with an elevated thumb rest—second embodiment
570. Elevated thumb rest—second embodiment
571. Base of the elevated thumb rest—second embodiment
572. Height of the elevated thumb rest—second embodiment
573. Contact surface of the elevated thumb rest—second embodiment
580. Bottom chopstick with a coupling bar built into the thumb rest—third embodiment
581. Neck of coupling bar built into the thumb rest—third embodiment
584. Bottom chopstick with a coupling bar built into it—fourth embodiment
585. Neck of coupling bar built into the bottom chopstick—fourth embodiment
591. Short removable sleeve with a groove—fifth embodiment
592. Long removable sleeve with a groove—sixth embodiment
593. Long removable sleeve with a groove for a round chopstick—seventh embodiment
594. A groove provided by a removable sleeve—fifth, sixth and seventh embodiments Further areas of applicability of the present disclosure will become apparent from the detailed description provided hereinafter. It should be understood that the detailed description and specific examples, while indicating some embodiments of the disclosure, are intended for purposes of illustration only and are not intended to limit the scope of the disclosure. Furthermore, this application is to be submitted on December 25. Happy birthday, mom.

DETAILED DESCRIPTION OF THE INVENTION

First Embodiment of Training Chopsticks

Figure 1C:
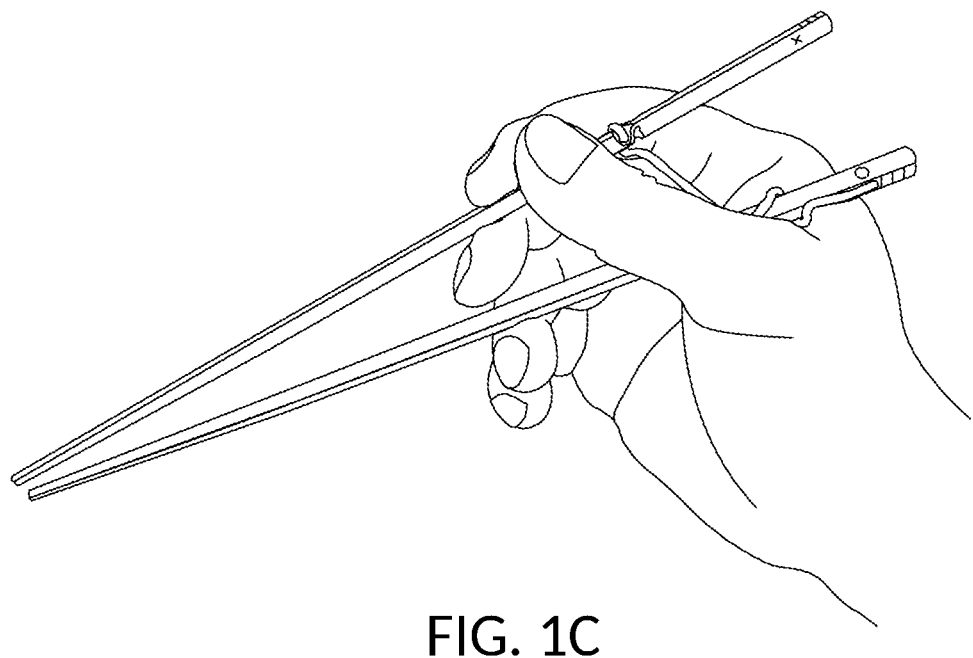
FIG. 1C is a view of the right hand holding the first embodiment of training chopsticks, from 1W, now at the closed end of the standard grip and alternating motion, where tips of chopsticks touch.

FIG. 1W illustrates the first embodiment of training chopsticks being wielded by a human hand, captured at the wide-open posture. FIG. 1C illustrates the first embodiment at the closed posture when tips of chopsticks touch. As already discussed, the first embodiment is created to train learners who are unable to twirl and secure chopsticks at the same time. It addresses the issue that the thumb pose required by the standard grip is difficult to master. It honors the insight that chopstick twirling follows principles of the planetary gear train. The resulting design allows a learner to master the two aspects of the standard grip separately. The coupling bar allows the learner to securely hold both chopsticks before learning the thumb pose. The C-hook allows the learner to twirl the top chopstick using both rolls and pitch angle changes, despite the top chopstick being physically coupled to the bottom chopstick.

Figure 2W:
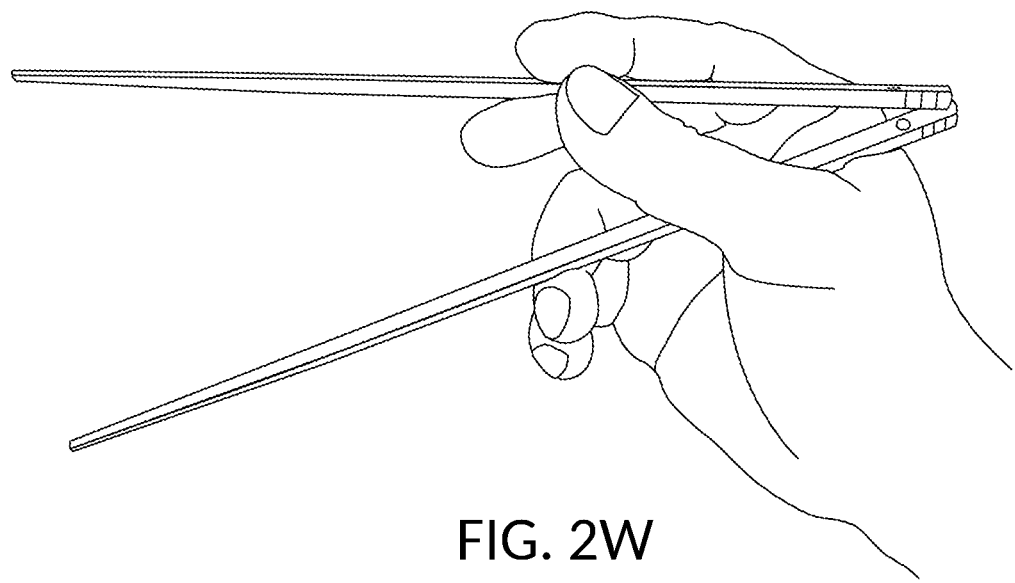
FIG. 2W is a view of a right hand holding a pair of plain chopsticks, at the wide-open end of the standard grip and alternating motion, demonstrating that identical finger posture and chopstick manipulation are used with plain chopsticks in this illustration, as used with training chopsticks shown in FIG. 1W.
Figure 2C:
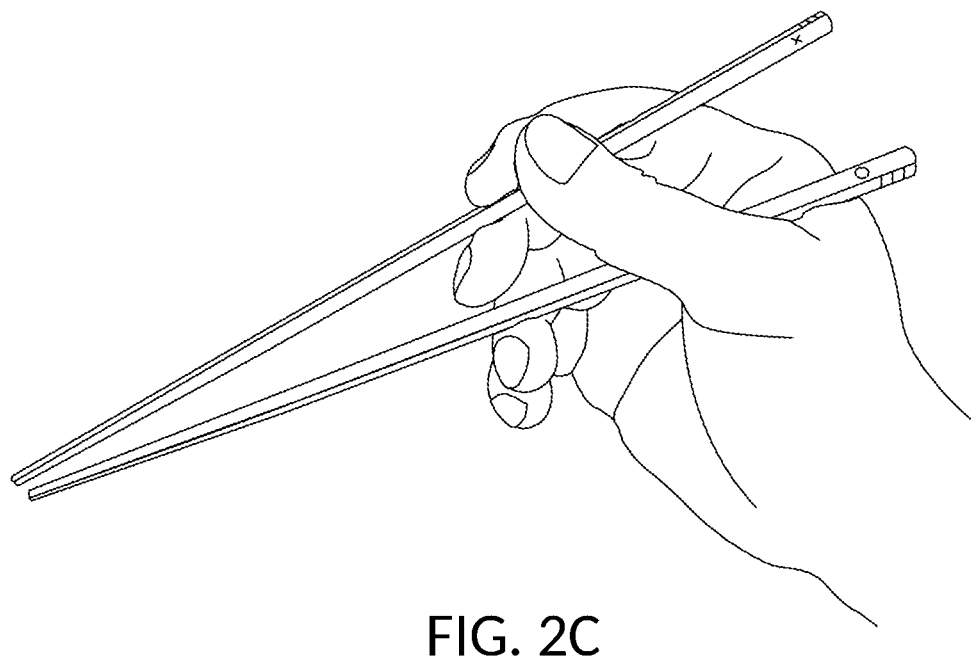
FIG. 2C is a view of the right hand holding the plain chopsticks from 2W, now at the closed end of the standard grip and alternating motion, demonstrating that identical finger posture and chopstick manipulation continue to be used with plain chopsticks in this illustration, as used with training chopsticks shown in FIG. 1C.

FIG. 2W and FIG. 2C illustrate the same human hand wielding a pair of plain chopsticks. By comparing these to FIG. 1W and FIG. 1C, one can confirm that these training chopsticks can be operated in exactly the same way plain chopsticks are operated.

Standard Grip and Alternating Motion

The "standard grip" allows a human hand to spread tips of two chopsticks apart, such that these two chopsticks form an angle equal to or greater than 30 degrees, as illustrated in the "wide-open posture" in FIG. 1W and FIG. 2W. In the "closed posture" of the standard grip, the two tips touch or almost touch, and the rear ends of the two chopsticks are extended apart, as illustrated in FIG. 1C and FIG. 2C. The "alternating motion" of the standard grip denotes sequences of movements of fingers manipulating chopsticks back and forth, between the wide-open posture and the closed posture. In this disclosure, only the top chopstick is twirled by a user. The bottom chopstick remains static.

Hand and Fingers

Figure 3A:
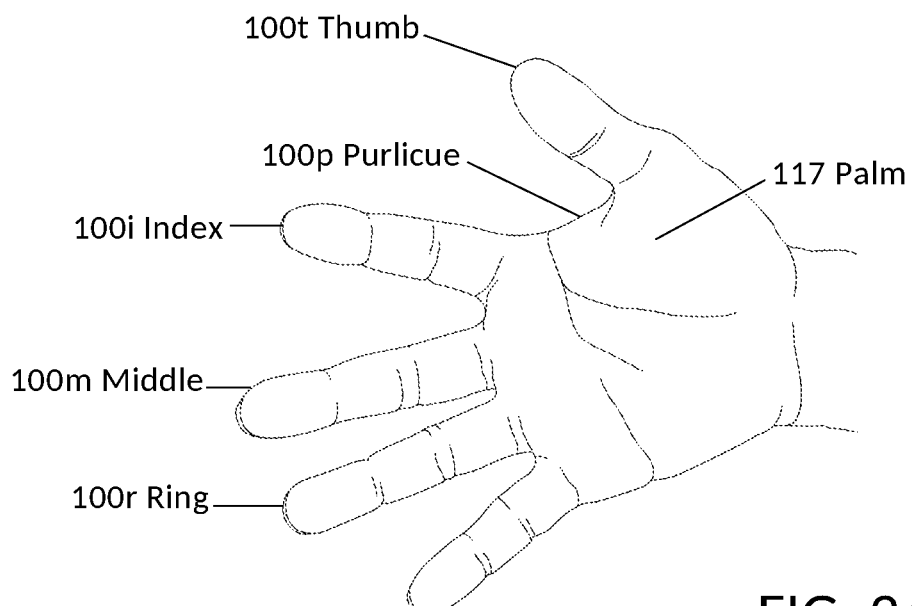
FIG. 3A is a view of the right hand from 1W, now with the palm open and all 5 fingers extended, illustrating the location of the purlicue and the four fingers used to manipulate chopsticks.

A medium-size adult right hand is shown in FIG. 3A, and is used throughout this disclosure. However, a left hand will also work—training chopsticks can be mirrored for a left hand. Four fingers are involved in manipulating chopsticks.

They are: thumb 100t, index finger 100i, middle finger 100m, and ring finger 100r. The web between thumb 100t and index finger 100i is purlicue 100p; it is instrumental in holding the bottom chopstick. All five fingers connect with palm 117.

Figure 3B:
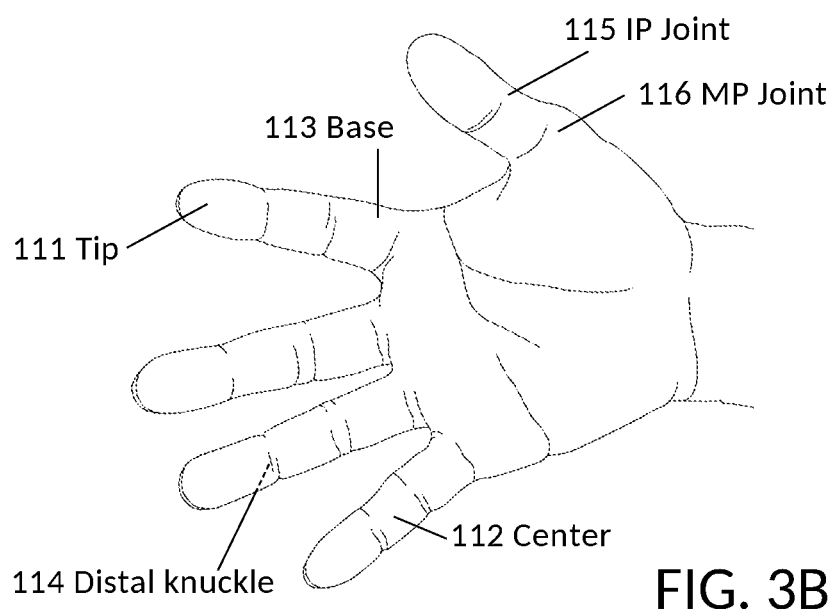
FIG. 3B is a view of the right hand from 3A, illustrating names of various segments of fingers, the distal knuckle, and the two joints of the thumb.

FIG. 3B illustrates various parts of fingers. The distal segment of a finger is a tip segment 111. The segment connecting a finger to the palm is a base segment 113. The segment in between is a center segment 112. The thumb is the only finger without a center segment. In addition, the knuckle between a tip segment and a center segment is a distal knuckle 114. Two joints in the thumb are discussed at length in this disclosure, the Interphalangeal joint (IP joint) and the Metacarpophalangeal joint (MP joint). The IP joint 115 connects the tip segment of the thumb to the base segment. The MP joint 116 connects the base segment of the thumb to the palm.

Unnatural Thumb Pose

The thumb plays several roles in the standard grip. As illustrated in FIG. 2W and FIG. 2C, the tip segment of the thumb is used to roll the top chopstick in the twirling motion. The same tip segment is also used to securely hold the top chopstick in place, against the index finger and the middle finger. At the same time, the base segment of the thumb is used to securely hold the bottom chopstick in place, against the ring finger and the purlicue. In order to serve all these functions, the thumb needs to be placed in an awkward and unnatural pose. This will be expounded shortly.

Figure 4A:
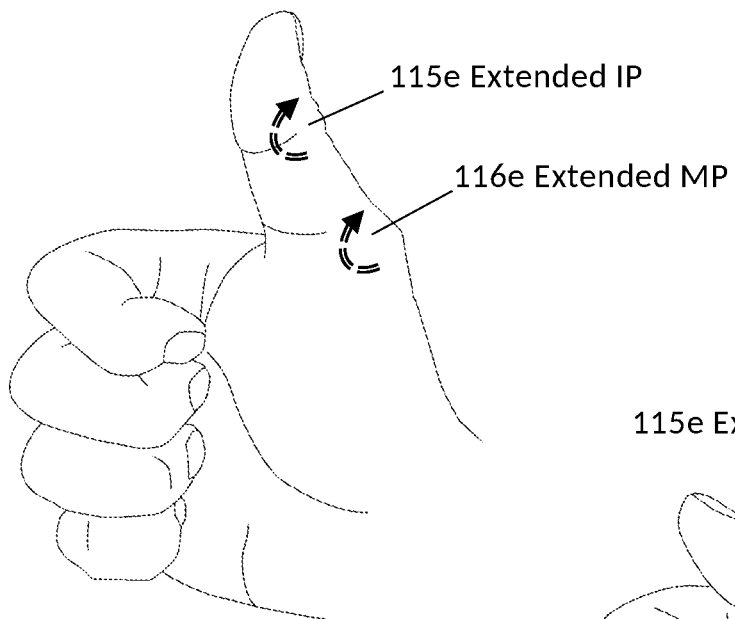
FIG. 4A illustrates the thumbs-up gesture, where the thumb is extended upward, with its two segments straightened to align with the back of the hand.

FIG. 4A illustrates one thumb pose that people are able to perform instinctively. It is the thumbs-up gesture. The thumb points upward, with its two segments straightened to align with the back of the hand. That is, both the MP joint and the IP joint are "extended" outward. They are indicated by extended MP joint 116e, and extended IP joint 115e.

Figure 4C:
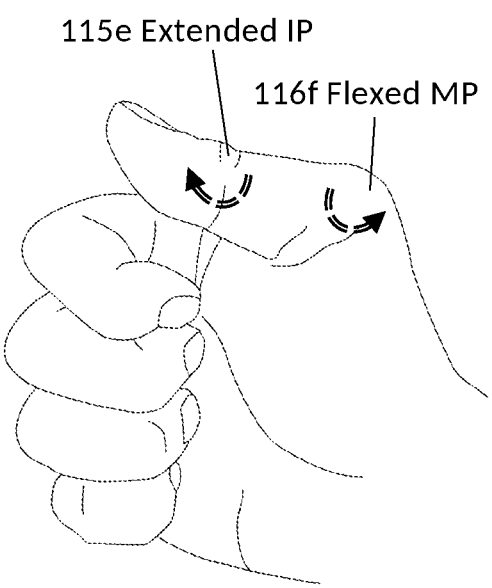
FIG. 4C illustrates the unnatural thumb pose prescribed by the standard grip, where the base segment of the thumb flexes (bends) inward, while the tip segment extends outward.
Figure 4B:
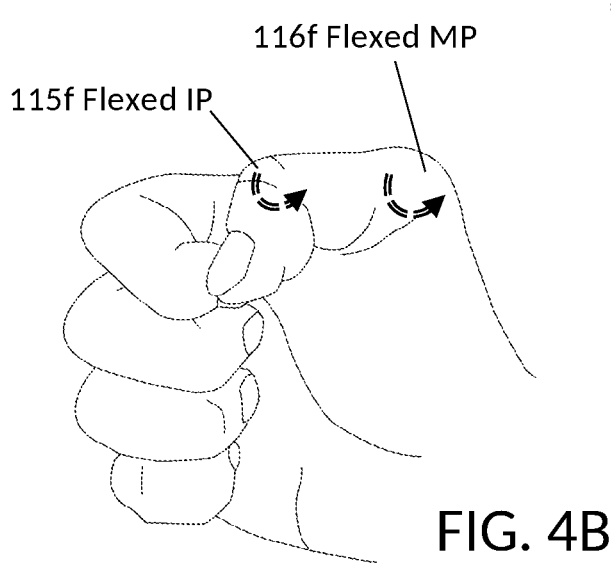
FIG. 4B illustrates the closed-fist gesture, where the thumb is curled, with its two segments flexed (bent) inward.

FIG. 4B illustrates another pose that people can easily perform. It is the closed-fist gesture. The thumb is curled, with its two segments bent inward. That is, both the MP joint and the IP joint are "flexed". They are indicated by flexed MP joint 116f, and flexed IP joint 115f.

Unfortunately for a chopstick learner, what is needed for the standard grip is the unnatural thumb pose shown in FIG. 4C. This pose requires that a learner bend the base segment of the thumb, while extending the tip segment. That is, the MP joint flexes inward, while the IP joint extends outward. They are indicated by flexed MP joint 116f, and extended IP joint 115e.

Some people find it difficult to make the standard grip thumb pose as shown in FIG. 4C. Some people are able to force the thumb into this pose temporarily, but cannot hold this pose for long. These people find it hard to learn to use the standard grip, because they need to acquire three separate skills simultaneously: to hold the unnatural thumb pose for prolonged periods, to twirl chopsticks, and to use the thumb to secure both chopsticks against the rest of fingers and the purlicue. Any one of these skills is already difficult to learn by itself. When all three must be mastered at the same time, then a learner is unable to make progress in any one.

Holding and Twirling Simultaneously

Figure 5W:
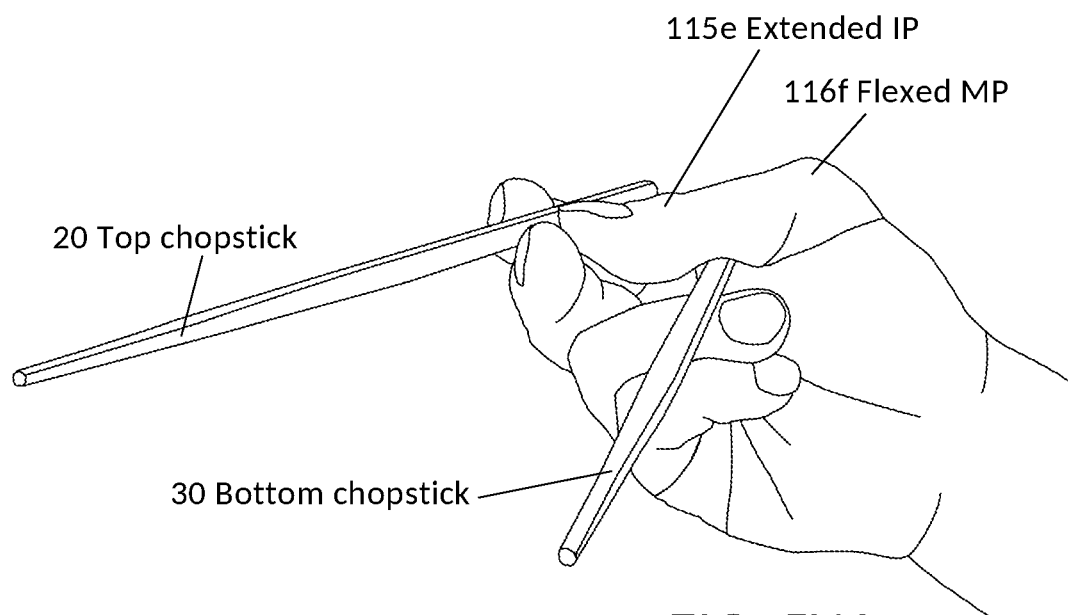
FIG. 5W is a front view of the right hand holding plain chopsticks from 2W, at the wide-open posture, illustrating how the thumb pulls double duty, securing both chopsticks, and simultaneously twirling the top chopstick together with the index finger and the middle finger.
Figure 5C:
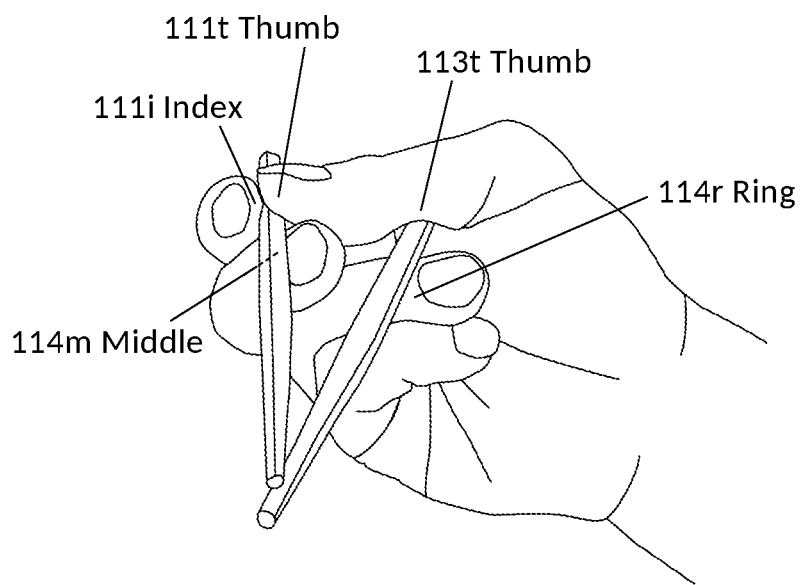
FIG. 5C is a front view of the right hand holding plain chopsticks from 2C, at the closed posture, illustrating how the thumb pulls double duty, securing both chopsticks, and simultaneously twirling the top chopstick together with the index finger and the middle finger.

FIG. 5W and FIG. 5C show the thumb pulling double duty, securing a pair of plain chopsticks, and simultaneously twirling the top chopstick, as captured at the wide-open posture (FIG. 5W) and the closed posture (FIG. 5C), respectively. The unnatural pose of the thumb from FIG. 4C is observed in both FIG. 5W and FIG. 5C. Flexed MP joint 116f allows the base segment of the thumb to securely hold bottom chopstick 30. Extended IP joint 115e presents the pulp of the tip segment for twirling top chopstick 20.

The unnatural pose of the thumb allows the base segment 113t of the thumb to saddle plain bottom chopstick 30 in FIG. 5C, pressing it not only towards the palm against distal knuckle 114r of the ring finger, but also caging it horizontally from the left, against distal knuckle 114r on the right. This prevents bottom chopstick 30 from slipping out of its position leftward and downward, following the slope of the back of the ring finger.

At the same time, the thumb pushes against the index finger and the middle finger, throughout the twirling motion, never giving plain top chopstick 20 a chance to escape the tripod hold by the three fingers. FIG. 5C shows thumb tip segment 111t, index tip segment 111i, and middle distal knuckle 114m forming a tripod hold around top chopstick 20.

It is thus observed that the unnatural pose of the thumb is an essential element of the standard grip. Without this thumb pose, bottom chopstick 30 will not remain secured, but will instead slip away from its designated position. Without this unnatural thumb pose, the thumb will not be effective at rolling top chopstick 20 throughout the alternating motion.

Coupling Bar

Figure 6W:
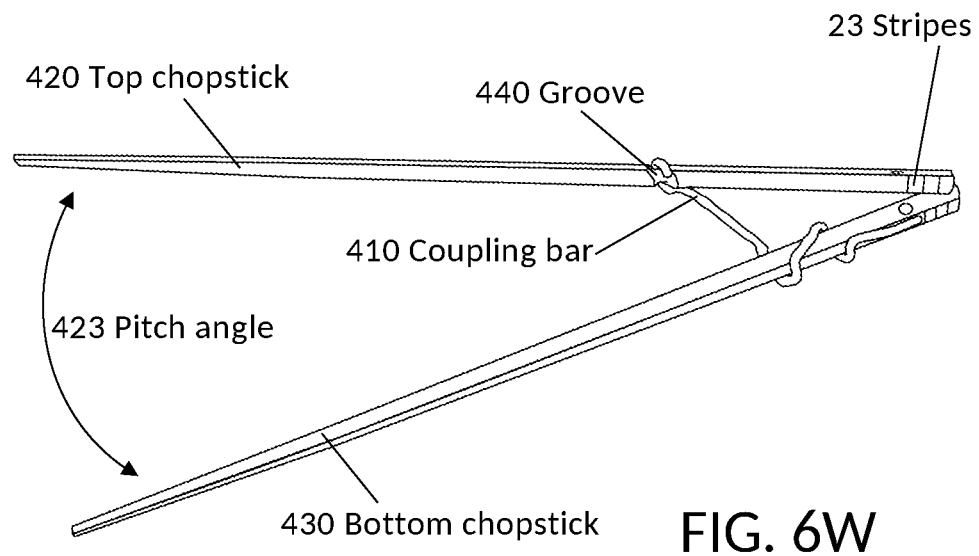
FIG. 6W is a view of the first embodiment of training chopsticks from FIG. 1W at the wide-open posture, without the right hand, showing the bottom chopstick, the carved top chopstick housing the groove, and a C-hook coupling bar connecting both chopsticks.
Figure 6C:
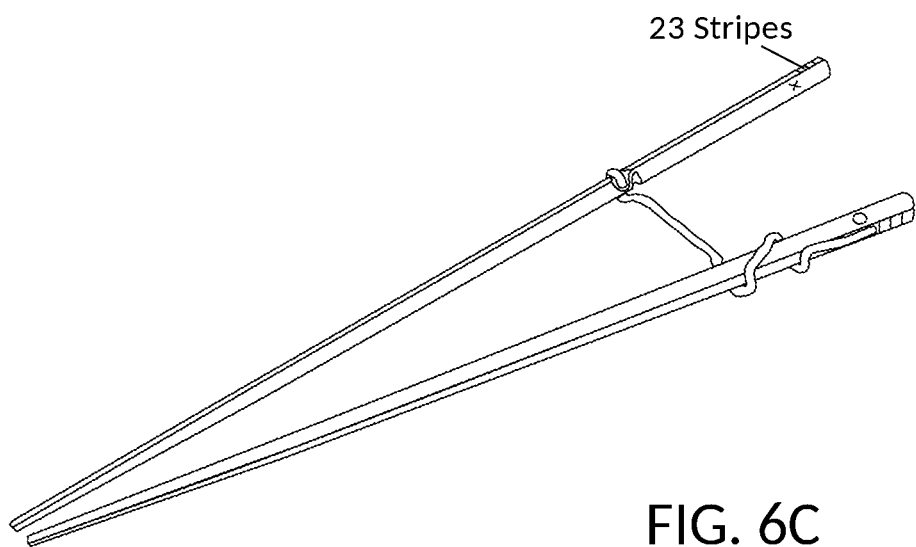
FIG. 6C is a view of the first embodiment of training chopsticks from FIG. 1C at the closed posture, without the right hand, showing the bottom chopstick, the carved top chopstick housing the groove, and a C-hook coupling bar connecting both chopsticks.

FIG. 6W is a view of the first embodiment of training chopsticks from FIG. 1W, captured at the wide-open posture, without the right hand, showing bottom chopstick 430, top chopstick 420 with a carved groove 440, and a C-hook coupling bar 410 connecting both chopsticks. FIG. 6C shows the same first embodiment at the closed posture.

One purpose of coupling bar 410 is to hold the two chopsticks at the correct distance apart at all times, even if a learner is unable to attain at first the unnatural thumb pose, and thus cannot properly secure the two chopsticks in her hand. Maintaining the correct distance is important, as the distance directly determines the maximum pitch angle 423 that can be achieved (FIG. 6W). A reduced distance results in reduced maximum pitch angle. With the coupling bar in place, a learner needs only secure the top chopstick with a tripod hold (thumb, index and middle fingers), and the bottom chopstick will remain secured in its correct position in her hand, even without help from the base segment of the thumb (FIG. 1W and FIG. 1C).

Another purpose of the coupling bar is to help with the rolling of top chopstick 420. The C-hook and the groove are designed such that the roll and the pitch angle change of top chopstick 420 are interlinked. Thus, top chopstick 420 rolls, when fingers try to move it up or down. Conversely, top chopstick 420 pitches up or down, when fingers try to roll it. This roll is confirmed visually by the movement of striped mark 23 in FIG. 6W and FIG. 6C. A learner can therefore learn properly twirling, by simply following the pre-programmed movement.

Structure of Chopstick Components

Figure 7:
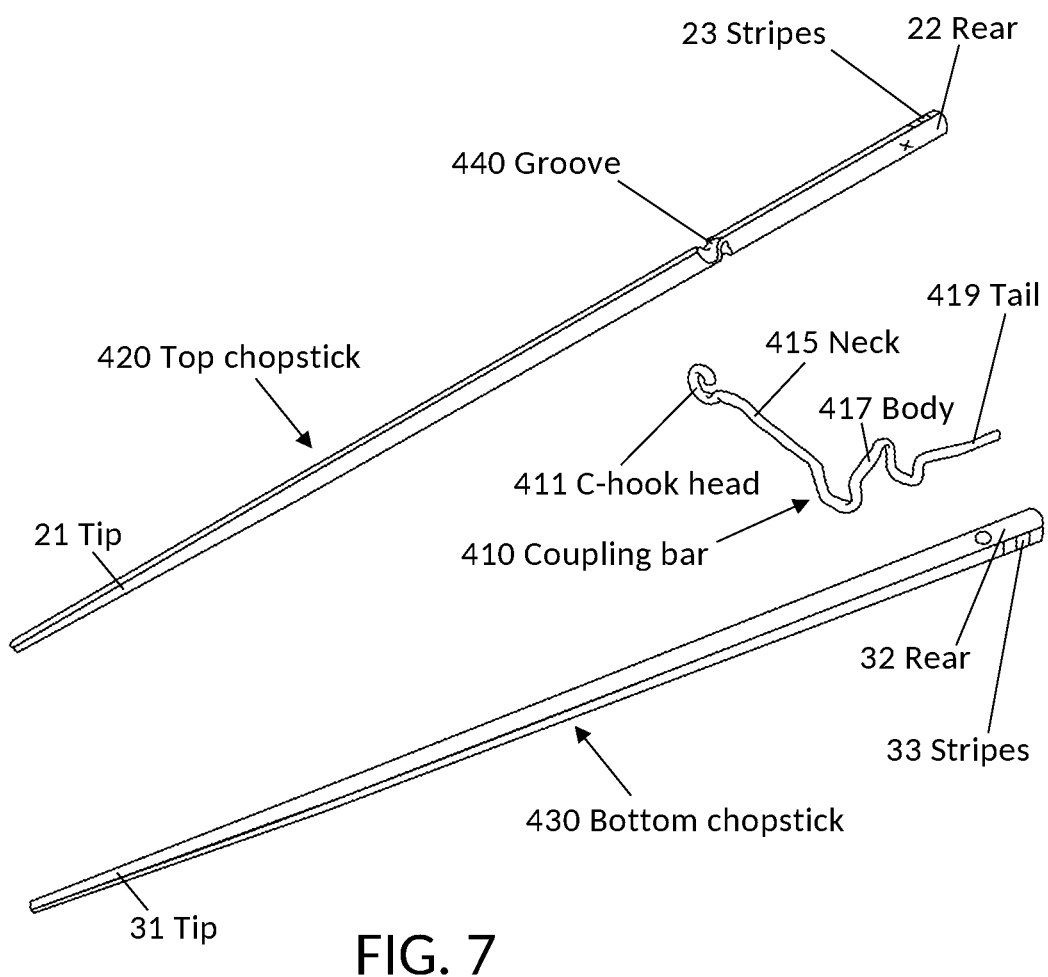
FIG. 7 is an exploded view of training chopsticks from FIG. 6C, with the C-hook coupling bar detached from both the top chopstick and the bottom chopstick, such that the groove can be seen without obstruction, and that the full body of the coupling bar can be examined.

FIG. 7 illustrates the three components of the first embodiment in their detached state: bottom chopstick 430, top chopstick 420, and C-hook coupling bar 410.

Bottom chopstick 430 in FIG. 7 is a plain, Japanese square chopstick. It has a square cross section, thus the name. The chopstick measure 9 inches, or 23 cm, long. Tips 31 is the part of bottom chopstick 430 for picking up food, and is tapered. The rear end is labeled 32. Striped mark 33 is shown in drawings such as FIG. 7, only for illustration purposes. It allows readers to track faces of bottom chopstick 430, between drawings of the wide-open posture and the closed posture (e.g. FIG. 6W and FIG. 6C).

Top chopstick 420 in FIG. 7 is also a square chopstick, of the same length as bottom chopstick 430. Tip 21 and rear end 22 are indicated. Striped mark 23 is shown similarly for illustration purposes only. Top chopstick 420 has a roughly circumferential groove 440 carved into it, close to rear end 22. The structure of groove 440 will be described in details in the next section.

C-hook coupling bar 410 in FIG. 7 is formed from a piano wire, for its yield strength. It comprises four distinct portions: C-hook head 411, neck 415, body 417 and tail 419. Head 411 is formed in the shape of a C-hook, thus the name. Other names for this shape include swag hook and clevis forest hook. The C-hook is capable of being snapped into groove 440, with a loose fit allowing for rolls and pitch angle changes of top chopstick 420. C-hook head 411 turns into neck 415 which is a straight section roughly equal in length to the base segment of the thumb. Neck 415 leads into body 417 which is roughly a square spiral. The square spiral is shaped wide enough to allow bottom chopstick 430 to pass through it, but is also wound tightly enough to make a snug fit with bottom chopstick 430. The square spiral presents several clip-like parts which clasp the chopstick. The spring-like nature of the piano wire allows the spiral lines to be stretched to accommodate chopsticks of different thickness. Lastly, body 417 ends in tail 419 which further secures the spiral body, making it immobile around bottom chopstick 430 once attached.

Structure of the Groove

Figure 8L:
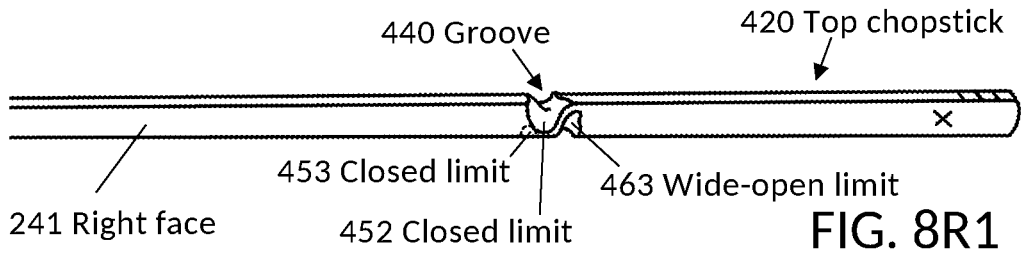
FIG. 8L shows a close-up view of the left face of the top chopstick from FIG. 7.
Figure 8L:
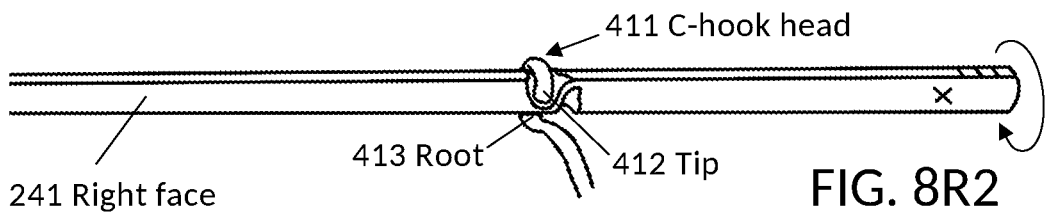
Figure 8L:
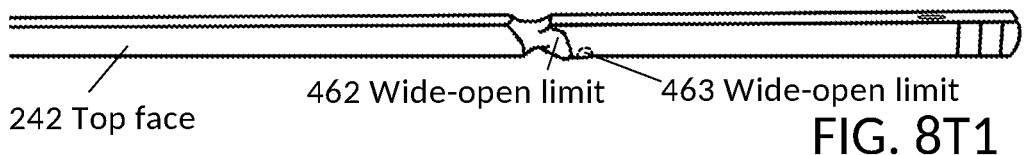
Figure 8L:
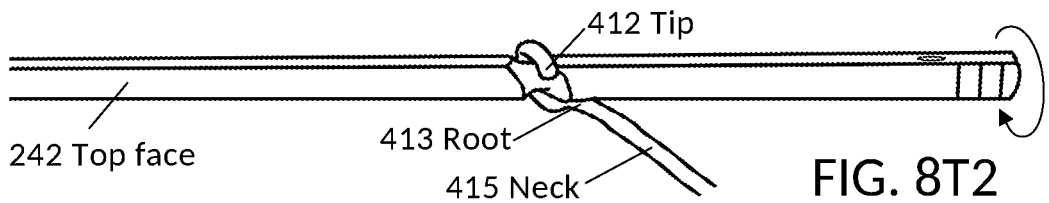
Figure 8L:
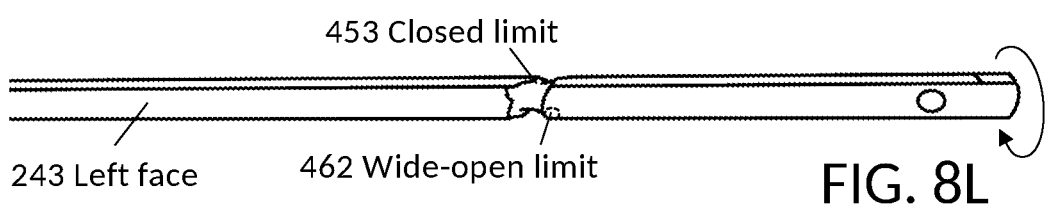

Six close-up views of top chopstick 420 from the first embodiment are illustrated in FIG. 8R1, FIG. 8R2, FIG. 8T1, FIG. 8T2, FIG. 8L, and FIG. 8B. These views show the slightly-spiral nature of groove 440. FIG. 8R2 and FIG. 8T2 show how C-hook head 411 fits loosely within this groove. The loose fitting gives groove 440, and thus top chopstick 420, enough degrees of freedom within the confinement of C-hook head 411, such that top chopstick 420 is able to roll around its longitudinal axis for 90 degrees, and able to pitch up and pitch down, with respect to the orientation of head 411.

FIG. 8R1 is a view of right face 241 of top chopstick 420. In this view, the two ends of the groove 440 are visible, marked by closed limit portion 452, and by wide-open limit portion 463. Groove 440 is a circumferential groove carved around the longitudinal axis of top chopstick 420. This circumferential groove, however, does not form a complete circle. That is, the two ends of the circumference do not meet. Instead, these two ends (closed limit 452 and wide-open limit 463) are offset along the longitudinal axis of top chopstick 420. This offset causes groove 440 to form a spiral shape. The closed limit portion 453 on the bottom face is not visible from the right face, but is nonetheless indicated by dashed lines in this view for subsequent discussion of FIG. 8R2.

FIG. 8R2 shows the same right face 241 of the top chopstick, but now with C-hook head 411 fitted into the groove. The opening in the C-hook is just wide and flexible enough to be forced past the circumference of the groove, and to click into place around the groove. Head 411 in FIG. 8R2 sits at the closed posture of the standard grip. Its tip 412 comes to a rest abutting closed limit portion 452 from FIG. 8R1. Its root 413 is prevented from slipping out of the groove by closed limit portion 453 from FIG. 8R1.

FIG. 8T1 is a rotated view of FIG. 8R1, showing top face 242 of the top chopstick. The wide-open limit portion 462 is visible on the top surface of the groove in this view. The wide-open limit portion 463 previously visible in FIG. 8R1 and FIG. 8R2 has now been rotated out of the view. It is nonetheless indicated by dashed lines in this view for subsequent discussion of FIG. 8T2.

FIG. 8T2 shows the same top face 242 of the top chopstick, but now with C-hook head 411 fitted into the groove. Head 411 in FIG. 8T2 sits at the wide-open posture of the standard grip. Its tip 412 is prevented from slipping out of the groove by wide-open limit portion 462 from FIG. 8T1. Its root 413 comes to a rest abutting wide-open limit portion 463 from FIG. 8T1. Note how neck 415 is inclined drastically at this wide-open posture, per standard grip requirement, compared to the closed posture shown in FIG. 8R2. This change in the angle between the top chopstick and neck 415 is a result of the spiral shape of the groove.

FIG. 8L is a rotated view of FIG. 8T1, showing left face 243 of the top chopstick. The closed limit portion 453 is just visible on the bottom surface of the groove in this view. The wide-open limit portion 462 previously visible in FIG. 8T1 has now been rotated out of the view. It is nonetheless indicated by dashed lines in this view for continuity from FIG. 8T1.

Figure 8B:
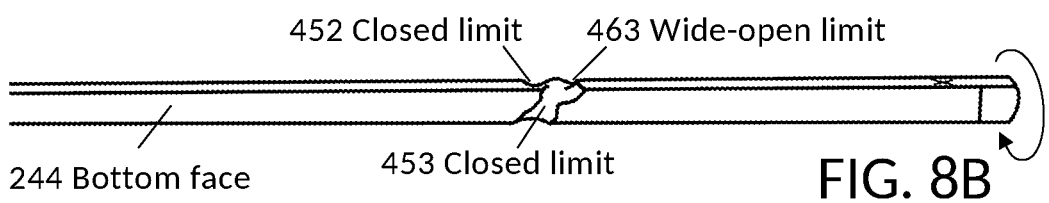
FIG. 8B shows a close-up view of the bottom face of the top chopstick from FIG. 7.

FIG. 8B is a rotated view of FIG. 8L, showing bottom face 244 of the top chopstick. The closed limit portion 453 is clearly visible on the bottom surface of the groove in this view. The closed limit portion 452 and the wide-open limit portion 463 are barely visible on the right surface of the groove in this view. They are nonetheless indicated in this view, for continuity of viewing, as they will become prominently visible, once the top chopstick is further rotated into FIG. 8R1.

Operation of Training Chopsticks

As described earlier, the first embodiment of training chopsticks can be operated in exactly the same way plain chopsticks are operated, except that the bottom chopstick is by design held immobile. These training chopsticks offer assistance to learners, including helping learners find correct, everchanging positions on chopsticks, throughout the alternating motion. They allow learners to secure the bottom chopstick without having to actively focus on the unnatural thumb pose required by the standard grip. Thus, learners can instead focus on learning to twirl the top chopstick first, guided by the pre-programmed chopstick movement, thanks to the shape of the groove and of the C-hook. Only after that does a learner need to shift her focus to master the unnatural thumb pose. Following sections describe these operations in details.

Initial Assembly of Training Chopsticks

The first embodiment of training chopsticks comes in three separate components, as described earlier, and as illustrated in FIG. 7. To assemble these for use, a learner first inserts the rear end of bottom chopstick 430 into the square spiral body 417 of coupling bar 410. Body 417 should fit snugly. Then the learner pushes C-hook head 411 into groove 440 with a slight force, and clicks the head into position around the circumferential groove, as shown in FIG. 8T2 (wide-open posture) or FIG. 8R2 (closed posture). The end result of the assembly should look like FIG. 6W (wide-open posture), FIG. 6C (closed posture), or some other configuration in between.

Initial Finger Posture

Training chopsticks make it easier for learners to master the initial finger placement for the standard grip. The initial finger placement for the closed posture is shown in FIG. 1C.

Start by assembling training chopsticks as described earlier into the configuration shown in FIG. 6C. Consult FIG. 9C for labels of parts. Use the left hand to hold tip 21 and tip 31 of the two chopsticks together. Open the palm of the right hand. The left hand places assembled training chopsticks on the palm, with coupling bar 410 lining up with the purlicue.

Figure 9W:
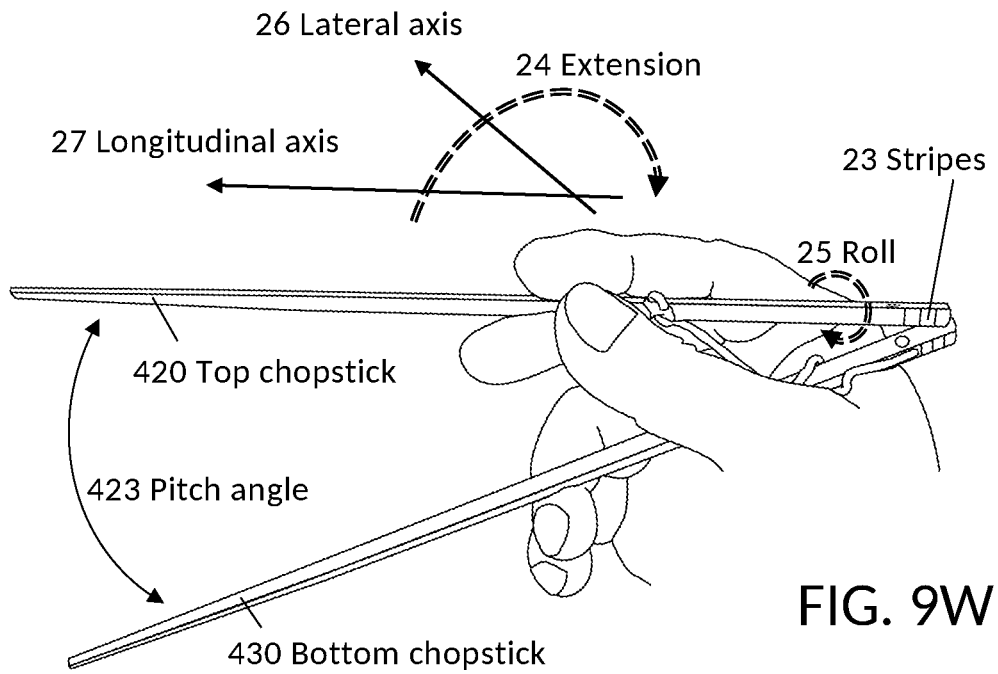
FIG. 9W is a view of the extensions and the roll required, in order to bring training chopsticks from the closed posture in FIG. 1C, to the wide-open posture in FIG. 1W, in the same way plain chopsticks are operated in FIG. 2C and FIG. 2W.
Figure 9C:
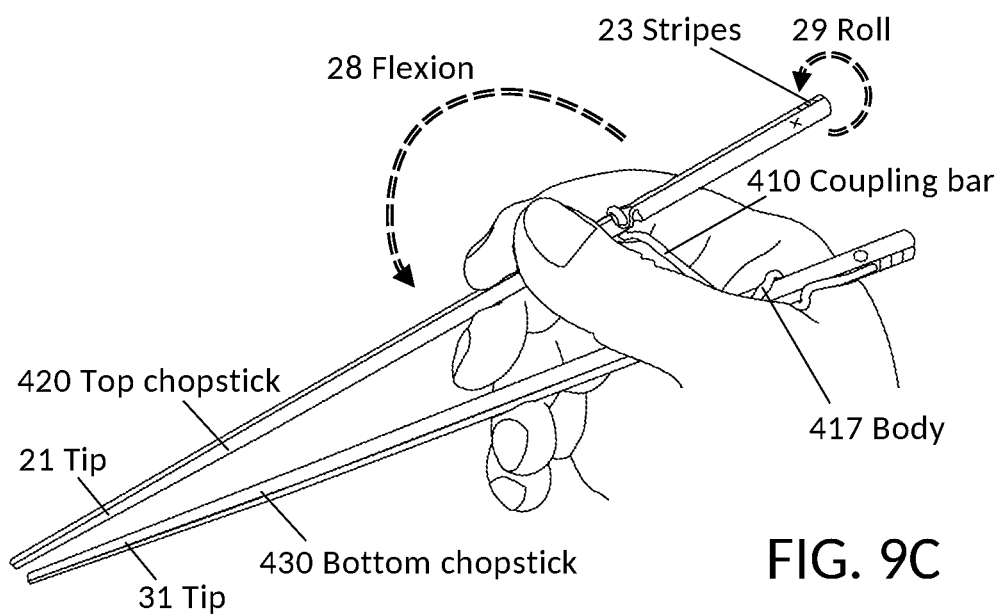
FIG. 9C is a view of the flexion and the roll required, in order to bring training chopsticks from the wide-open posture in FIG. 1W, to the closed posture in FIG. 1C, in the same way plain chopsticks are operated in FIG. 2W and FIG. 2C.

Curl all finger half way toward the closed-fist gesture as shown in FIG. 4B. Sandwich top chopstick 420 between the tip segment of the index finger, and the distal knuckle of the middle finger as shown in FIG. 9C. Then cover top chopstick 420 with the tip segment of the thumb. That is, use the thumb, the index finger and the ring finger to grasp the top chopstick, as if holding a pen. Rest the rear end of the top chopstick on the base of the index finger. Coupling bar 410 should now be located immediately behind the thumb. This simple act of holding the top chopstick automatically places body 417 of coupling bar 410 in between the base of the thumb, and the purlicue, establishing a proper position for bottom chopstick 430.

Move both ring finger and little finger to be under bottom chopstick 430 as shown in FIG. 9C, if they are not already in position. Bottom chopstick 430 rests on both the purlicue and the distal knuckle of the ring finger. The base segment of the thumb pushes down on bottom chopstick 430, preventing it from moving up, away from the purlicue and the ring finger.

Staying with FIG. 9C, use the left hand to grab tip 21 of top chopstick 420, and attempt to pull the top chopstick away from the right hand. The three gripping fingers of the right hand should surround the chopstick and hold it firmly, to establish good friction and pressure, preventing the chopstick from being pulled away. The right hand, the fingers and the chopstick should not deviate from the closed posture, while resisting the pull. Now, use the left hand to try to wiggle top chopstick 420 away from the correct orientation. If the three fingers properly surround the chopstick in a planetary gear train fashion as discussed earlier, then the left hand cannot easily nudge the chopstick off its correct orientation.

Throughout the above exercise, as a learner confirms a good tripod hold of top chopstick 420, the learner does not need to pay attention to whether bottom chopstick 430 has slipped away and fallen out of the hand. Coupling bar 410 keeps bottom chopstick 430 securely in place at all times, even if the learner doesn't.

Learning to Twirl the Top Chopstick

As discussed earlier, and as illustrated in FIG. 9W and FIG. 9C, top chopstick 420 needs to roll for 90 degrees back and forth, throughout the alternating motion of the standard grip, between the wide-open posture and the closed posture. This roll is a key enabler of the extension and the flexion of top chopstick 420. It allows top chopstick 420 to change its pitch angle 423, without a physical hinge or a fixed pivot. FIG. 9W illustrates the coordinated roll 25 around longitudinal axis 27, and extension 24 around lateral axis 26. These are required to extend tips of the two chopsticks apart.

With a pair of plain chopsticks, a learner needs to master this intricate three-finger twirling movement, in order to achieve the coordinated roll and extension shown in FIG. 9W. With the training chopsticks, however, the twirling skill can be learned gradually with assistance from the device. The groove and the C-hook are designed such that the orientation and the movement of top chopstick 420 are choreographed. The groove and the C-hook herd the top chopstick, so that it always follows the alternative motion of the standard grip. The top chopstick moves with pre-programmed and coordinated rolls, extension and flexion, as it goes from the closed posture to the wide-open posture, and back.

With the training chopsticks, a learner merely needs to attempt to lift or roll top chopstick 420, and it will move from the closed posture (FIG. 9C) to the wide-open posture (FIG. 9W) correctly, with necessary roll 25 and extension 24. The learner can therefore learn the right twirling finger dynamics, by following how top chopstick 420 wants to move, and by shifting fingers to track it and to continue to keep a firm grasp on it throughout the motion.

Similarly, a learner merely needs to attempt to bring down or roll top chopstick 420, for it to move itself from the wide-open posture (FIG. 9W) to the closed posture (FIG. 9C), with necessary roll 29 and flexion 28. Again, a learner can simply follow how top chopstick 420 wants to move, and shift fingers to keep a firm grasp on it throughout the motion. And the finger dynamics thus learned will be the correct one for twirling chopsticks.

When a learner thus masters the twirling motion, she will no longer depend on the groove and the C-hook to guide her finger movements. Instead, she will take control of the top chopstick with her fingers, anticipating constraints imposed by the groove and the C-hook. These are skills that translate directly to using plain chopsticks, past this training phase.

Throughout the twirling motion, between the closed posture (FIG. 9C) and the wide-open posture (FIG. 9W), the thumb will retain good surface contact with top chopstick 420 by pressing into it along its lateral axis 26. Friction and unbroken contact enable the thumb to firmly roll chopstick 420 against the index finger and the middle finger. Thus, the movement from the closed posture to the wide-open posture (FIG. 9W) is a flick of both index and middle fingers, assisted by the thumb and roll 25. The complementary movement back to the closed posture (FIG. 9C) involves the tip and the center segments of the index finger pulling top chopstick 20 downward, and the tip segment of the middle finger bending at the same rate to accommodate, assisted by the thumb and roll 29. The alternating motion of flicking and pulling of these two fingers resembles an "air quote".

Pre-Programmed Planetary Gear Train

Figure 10:
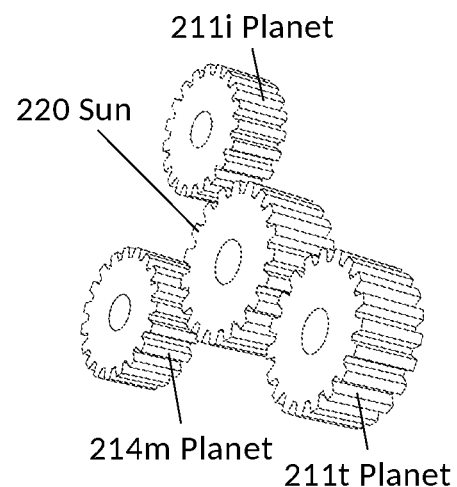
FIG. 10 compares the dynamics of three fingers manipulating the top chopstick (FIG. 9W), to that of a planetary gear train with three planet gears, shown without the outer gear ring.
Figure 10:
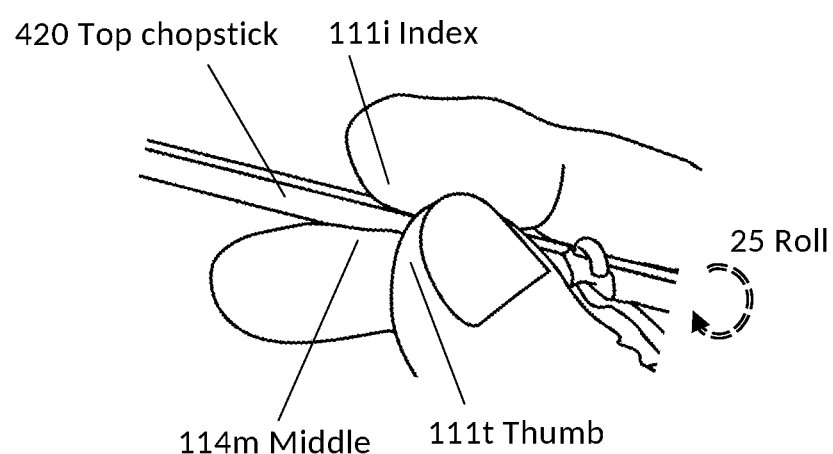

This twirling mechanism can be understood, in terms of mechanical advantages, as a planetary gear train, also known as an epicyclic gear train. This is illustrated in FIG. 10, which compares the three fingers holding top chopstick 420 to a planetary gear train. Top chopstick 420 is caged in by thumb tip 111$t$, index finger tip 111$i$, and distal knuckle 114$m$ of the middle finger. This is equivalent to a gear train where sun gear 220 is caged in by planet gears 211$t$, 211$i$ and 214$m$. Friction ridges on fingers act like gear teeth, meshing with surfaces of the top chopstick. This is one reason why square chopsticks are more popular than chopsticks with a round cross section—the edges on square chopsticks are good gripping areas. This is also why people find chopsticks with a completely smooth surface especially hard to use—fingers cannot mesh securely to slippery surfaces.

In FIG. 10, thumb tip 111$t$ is the primary driver for the roll. The thumb skin meshes with the surface of the chopstick, and allows the learner to roll the chopstick (e.g. roll 25). The outer gear ring which synchronizes planet gears in a planetary setup does not exist in physical forms here. The anatomy of the human hand and fingers is such that when a top chopstick is placed in the hand, between index finger tip 111$i$ and middle finger knuckle 114$m$, an air-quote gesture perfectly complements the rolling action of the thumb. Skin of the index finger and the middle finger mesh with chopstick surfaces. Chopstick 420 rolls along skin surfaces of these two fingers as they perform the air quote illustrated in FIG. 9W and FIG. 9C. The anatomy of the human hand serves as a virtual outer gear ring, synchronizing movements of the thumb, the index finger and the middle finger.

Recall that the air quote is responsible for extension 24 and flexion 28. This is why roll 25 and roll 29 are inseparable from extension 24 and flexion 28. This inseparable coordination between rolls, extension and flexion is pre-programmed into the shape of the groove and of the C-hook.

Learning to Secure the Bottom Chopstick

Once a learner has mastered top chopstick twirling, then she can proceed to focus on learning to secure the bottom chopstick, as discussed earlier and as shown in FIG. 5W and FIG. 5C. Again, the first embodiment of training chopsticks assists the learner on acquiring this skill.

Figure 11W:
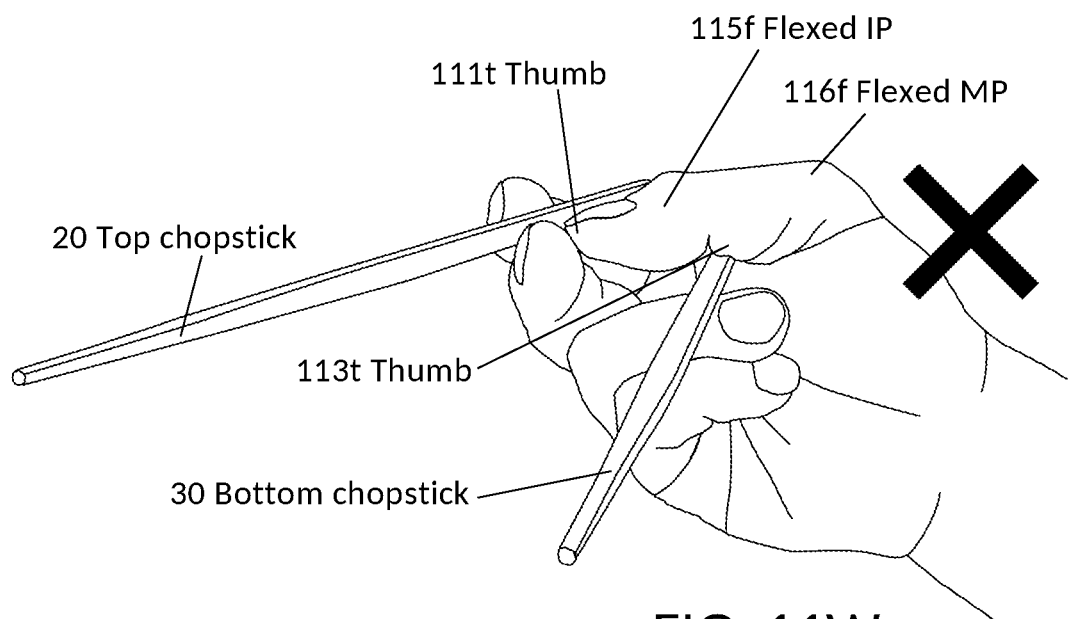
FIG. 11W is a view of a user with anatomical limitations attempting but failing to wield the pair of plain chopsticks from FIG. 2W, at the wide-open posture, due to the fact that the user is unable to completely extend the tip segment of the thumb, while flexing the base segment of the thumb, where the bending of the tip segment makes it hard for the tip of the thumb to properly grip the top chopstick, thus hampering the rolling of the top chopstick from this wide-open posture to the closed posture.
Figure 11C:
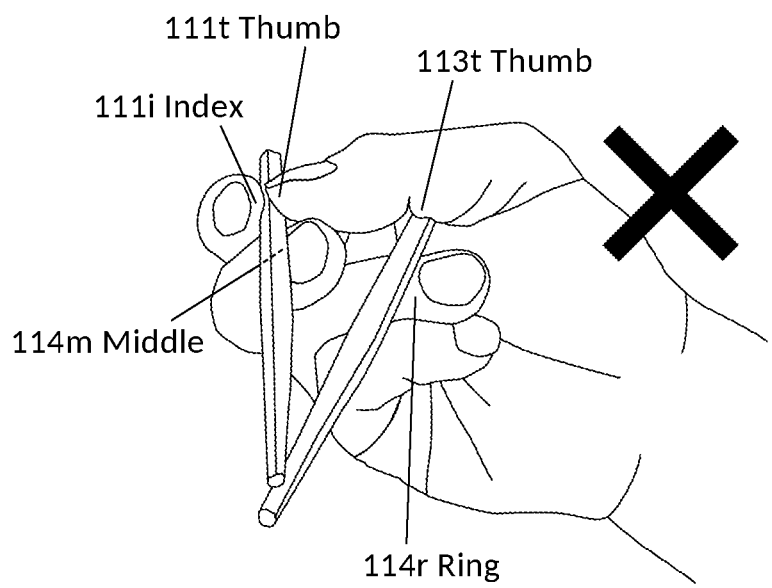
FIG. 11C is a view of a user with anatomical limitations attempting but failing to wield the pair of plain chopsticks from FIG. 2C, at the closed posture, due to the fact that the user is unable to completely extend the tip segment of the thumb, while flexing the base segment of the thumb, where the arched thumb is unable to keep the bottom chopstick from sliding out of the standard grip position.

The main challenge in learning to secure the bottom chopstick is the awkward and unnatural thumb pose required by the standard grip. Most learners instinctively flex both the IP joint and the MP joint, as shown in FIG. 11W and FIG. 11C. When the thumb is thus bent at both IP joint and MP joint, the reach of the tip segment 111$t$ of the thumb is much reduced. It becomes hard to manipulate top chopstick 20 (FIG. 11W). A learner in such a situation has no choice but to bring both chopsticks closer and closer together, where the thumb intercepts the chopstick at 111$t$ and at 113$t$ in FIG. 11C. Otherwise, thumb tip 111$t$ cannot work with index tip 111$i$ and distal knuckle 114$m$ to keep a proper tripod hold on the top chopstick. At the same time, the thumb base 113$t$ is angled in such a way that it constantly pushes bottom chopstick 30 away from the distal knuckle 114$r$, toward top chopstick 20, further reducing the distance. When chopsticks are close to each other, the maximum pitch angle 423 (FIG. 9W) that can be created is reduced. When they are too close, the standard grip stops working.

The first embodiment addresses this challenge with the C-hook coupling bar 410 shown in FIG. 9C. This bar keeps the two chopsticks separated at the correct distance throughout the alternating motion. Thus, maximum pitch angle 423 is guaranteed, at the wide-open posture, shown in FIG. 9W. This arrangement continuously reminds the learner to extend the tip segment of the thumb, and to flex the base segment, in order to reach across the length of the coupling bar. Only by this can the thumb meet and work with the index finger and the middle finger to twirl the top chopstick. Over time this arrangement trains the learner to master required motor skills to hold this unnatural thumb pose instinctively.

Once it is no longer difficult to hold the thumb pose for prolonged periods, a learner is no longer a learner, but a skilled chopstick user. This is because the unnatural thumb pose guarantees a secure hold on both chopsticks. The user no longer needs training chopsticks, and can instead wield a pair of plain chopsticks with dexterity and power.

Second Embodiment of Training Chopsticks

While some learners complete the last step of the chopstick training, as just described, others may find that they can never achieve the unnatural thumb pose required by the standard grip, due to injuries or congenital conditions. That is, they are unable to physically extend the IP joint of the thumb, while flexing the MP joint of the thumb, due to anatomical limitations. Thus, these learners are stuck in the suboptimal situation shown in FIG. 11W and FIG. 11C, with both flexed IP joint 115$f$ and flexed MP joint 116$f$. For these learners, no amount of practice will allow them to wield plain chopsticks properly using the standard grip.

Figure 12:
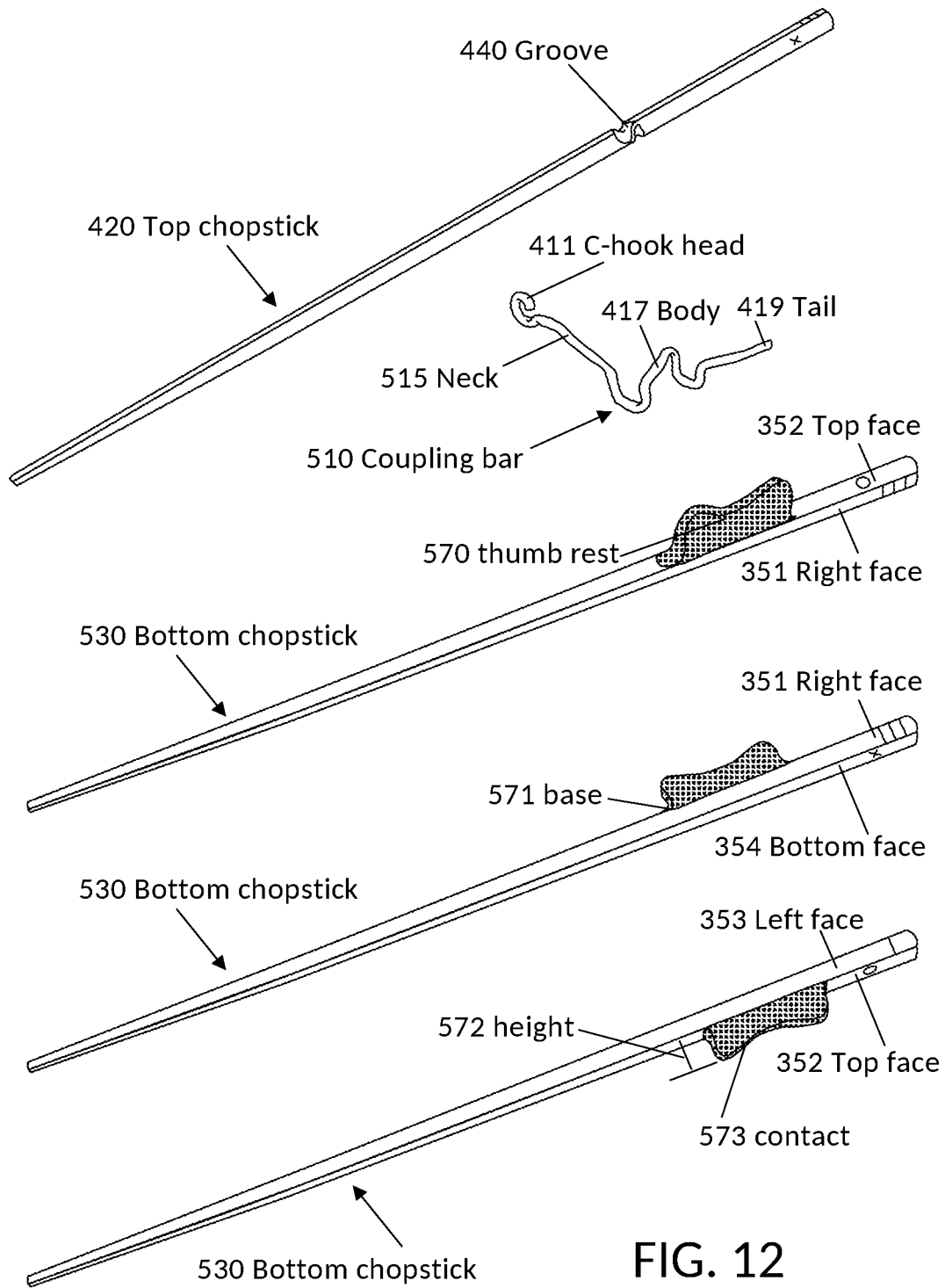
FIG. 12 shows the second embodiment of the present disclosure, derived from the first embodiment (FIG. 7), now with a shortened coupling bar, and an additional elevated thumb rest that is fixedly attached to the bottom chopstick.

The second embodiment of training chopsticks is designed for this second group of learners, shown in FIG. 12. These training chopsticks are derived from the first embodiment, with some changes. Firstly, the coupling bar is slightly shortened. Secondly, an elevated thumb rest is fixedly attached to the bottom chopstick.

Structure of the Second Embodiment

FIG. 12 illustrates the three components of the second embodiment in their detached state: top chopstick 420, C-hook coupling bar 510, and bottom chopstick 530.

The same top chopstick 420 from the first embodiment is used in the second embodiment. It has the same carved groove 440 as discussed.

The C-hook coupling bar in the second embodiment is similar to the one used in the first embodiment, except that it has a shortened neck portion. That is, coupling bar 510 retains the same head 411, body 417, and tail 419. But the neck portion in it is a shorted neck 515.

Bottom chopstick 530 is a square chopstick, of the same length as bottom chopstick 420. An elevated thumb rest 570 is fixedly attached to bottom chopstick 530, where the base segment of the thumb normally grips the bottom chopstick, per standard grip. Base 571 of thumb rest 570 is attached to top face 352 of bottom chopstick 530 only. Thumb rest 570 does not touch any of the three remaining faces of the square chopstick, right face 351, bottom face 354, and left face 353. Thumb rest 570 rises from its base 571 on top face 352, for a height 572 which is larger than the width of top face 352 (i.e. the width of the cross section of bottom chopstick 530). The contact surface 573 on thumb rest 570 has a concave shape, in order to receive the base segment of the thumb.

Operation of the Second Embodiment

Figure 13W:
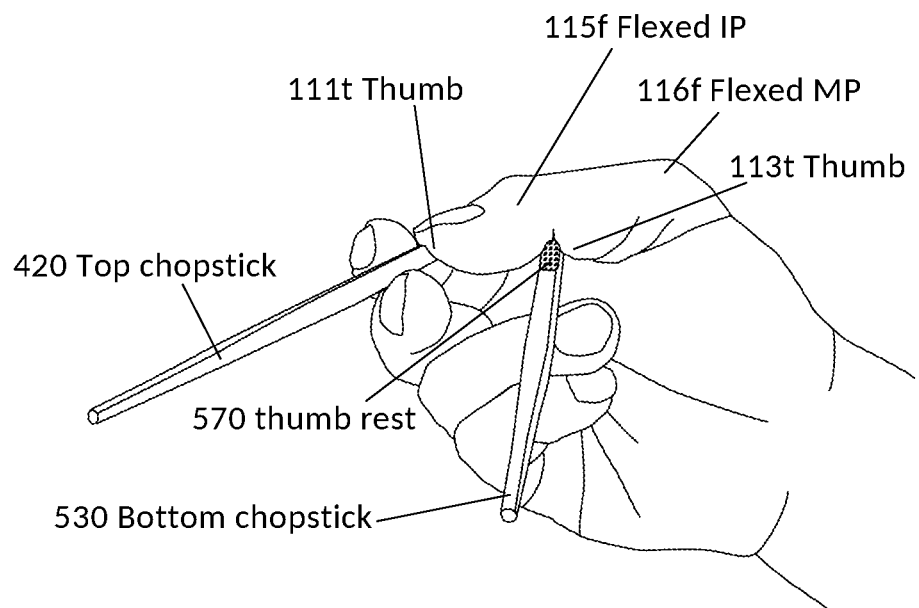
FIG. 13W illustrate how the second embodiment from FIG. 12 allows the second group of users to operate chopsticks using the standard grip, at the wide-open posture, with a non-standard thumb pose, by having the elevated thumb rest meet the arch of the thumb, in order to enable this non-standard thumb pose to securely hold the bottom chopstick, thus resolving the issue illustrated in FIG. 11W.
Figure 13C:
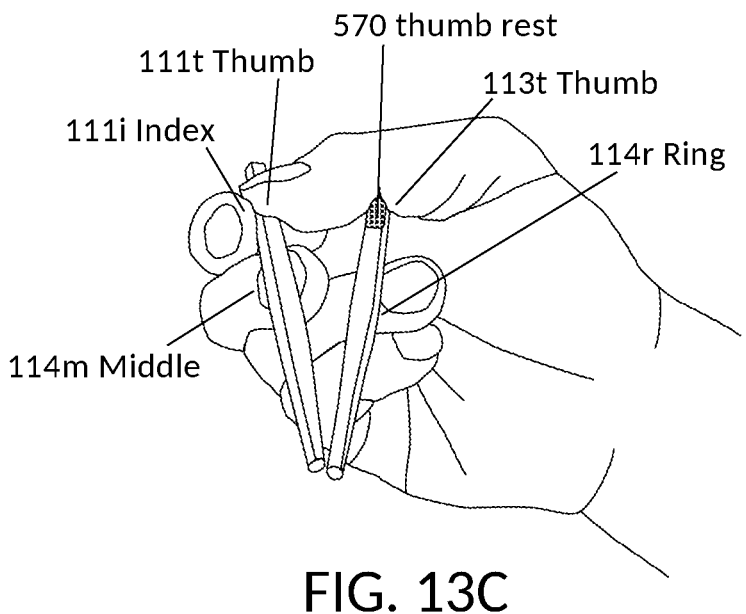
FIG. 13C illustrate how the second embodiment from FIG. 12 allows the second group of users to operate chopsticks using the standard grip, at the closed posture, with a non-standard thumb pose, by having the elevated thumb rest meet the arch of the thumb, in order to enable this non-standard thumb pose to securely hold the bottom chopstick, thus resolving the issue illustrated in FIG. 11C.

FIG. 13W and FIG. 13C illustrate how the second embodiment allows the second group of learners to operate chopsticks using the standard grip, with a non-standard thumb pose. This non-standard thumb pose is similar to that shown in FIG. 4B, where both segments of the thumb bend inward, indicated by flexed IP joint 115$f$ and flexed MP joint 116$f$. The arched thumb of this non-standard pose covers less distance between the tip of the thumb and the base of the thumb, compared to the standard but unnatural thumb pose shown in FIG. 4C. Thus, the coupling bar is shortened, to allow the arched thumb to reach top chopstick 420, and to manipulate it firmly, with the index finger and the middle finger.

The main contact surface on the thumb that secures bottom chopstick 530 has shifted partially away from base segment 113$t$, towards the IP joint, in FIG. 13W. The main contact surface is now the zenith of the arch formed by flexed IP joint 115$f$. Elevated thumb rest 570 meets the arch of the thumb, allowing even this non-standard thumb pose to hold bottom chopstick 530 securely. Base segment 113$t$ is now on the right side of thumb rest 570, when observed from the tip of bottom chopstick 530 toward the rear.

FIG. 13W illustrates how thumb rest 570 helps the thumb operate training chopsticks at the wide-open posture. Compare the overall position of the thumb in FIG. 13W (with the use of thumb rest 570), to the thumb position shown in FIG. 11W (with the use of plain chopsticks). Note how thumb rest 570 elevates both tip segment 111$t$ and base segment 113$t$ of the thumb, with respect to bottom chopstick 530 in FIG. 13W. This elevation and the shortened neck of the coupling bar (not visible in this view) work together to give tip segment 111$t$ of the thumb a better leverage at twirling top chopstick 420, despite the non-standard thumb pose.

Similarly, thumb rest 570 helps the thumb twirl top chopstick 420 at the closed posture, shown in FIG. 13C. Compare the position of tip segment 111$t$ of the thumb in FIG. 13C, to its position in FIG. 11C. Again, the elevation provided by thumb rest 570 and the shortened neck of the coupling bar work together to give tip segment 111*t* of the thumb a better leverage at twirling top chopstick 420, despite the non-standard thumb pose. Note how thumb tip 111*t*, index tip 111*i* and middle knuckle 114*m* now form a proper tripod hold, surrounding the top chopstick from three sides equally. They thus recreate the tripod hold shown in FIG. 5C where the standard grip thumb pose is required, even though a non-standard thumb pose is used in FIG. 13C.

Figure 14W:
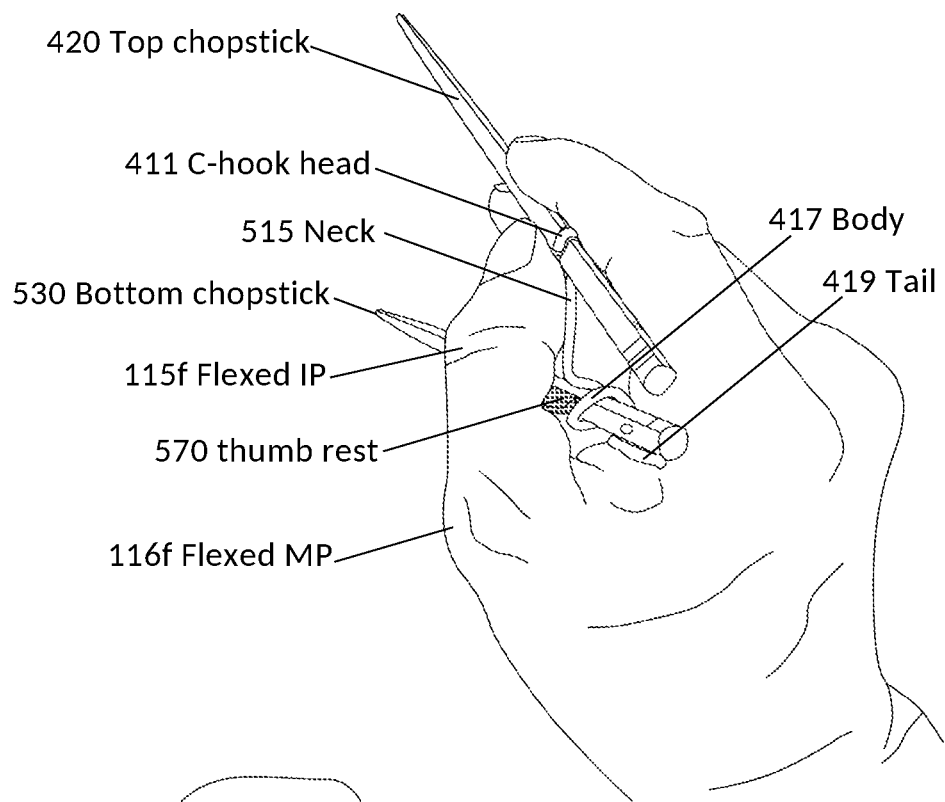
FIG. 14W is a rear view of the second embodiment from FIG. 13W, show how the shortened coupling bar allows the arched thumb to reach the top chopstick nevertheless, and to manipulate it firmly, with the index finger and the middle finger, at the wide-open posture.
Figure 14C:
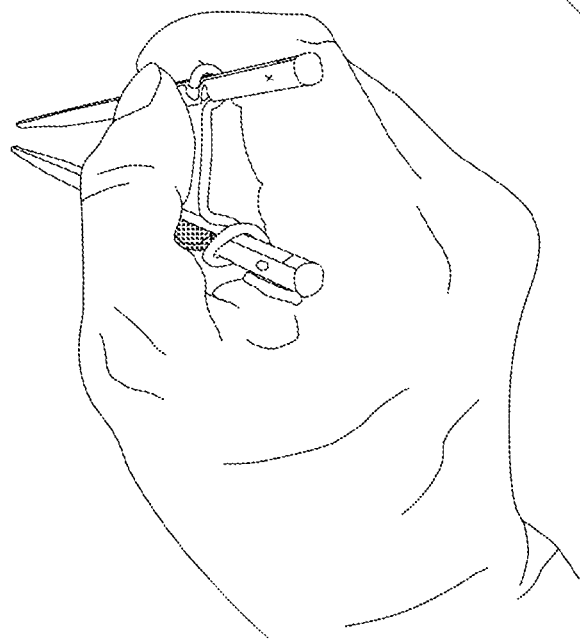
FIG. 14C is a rear view of the second embodiment from FIG. 13C, show how the shortened coupling bar allows the arched thumb to reach the top chopstick nevertheless, and to manipulate it firmly, with the index finger and the middle finger, at the closed posture.

FIG. 14W and FIG. 14C are rear views of the second embodiment, illustrating the C-hook coupling bar that is obscured by the thumb in FIG. 13W and FIG. 13C. During assembling of training chopsticks, body 417 of the coupling bar is pushed into bottom chopstick 530, until it abuts thumb rest 570. Tail 419 sits flush with the rear end of the chopstick. At the initial finger placement, shortened neck 515 guides the thumb for proper placement.

FIG. 14W illustrates how the shortened coupling bar allows the non-standard, arched thumb to reach the top chopstick and to manipulate it firmly, with the index finger and the middle finger, at the wide-open posture. C-hook head 411 couples with top chopstick 420, while remaining clear of finger skins that are involved in twirling top chopstick 420. Elevated thumb rest 570 meets the thumb arch formed by flexed IP joint 115*f* and flexed MP joint 116*f*, allowing this non-standard thumb pose to securely hold bottom chopstick 530. FIG. 14C similarly illustrates the operation of the second embodiment, at the closed posture.

While the bottom chopstick remains immobile with training chopsticks, the top chopstick rolls as it changes pitch angle, observed by comparing marks on the rear end of the top chopstick, between FIG. 14C and FIG. 14W. The second embodiment thus supports the same planetary gear train finger dynamics, for twirling the top chopstick, when compared to the first embodiment. The first embodiment is a temporary training device which can be put aside, once a learner masters the standard grip and can wield plain chopsticks unassisted. The second embodiment, however, is intended as a permanent aid, for users where flexed IP 115*f* and flexed MP 116*f* are a permanent physical reality.

Alternative Embodiments

While the disclosure is susceptible to various modifications and alternative constructions, certain illustrative embodiments are shown in the drawings and are described in detail. It should be understood, therefore, that there is no intention to limit the disclosure to the specific embodiments disclosed, but on the contrary, the intention is to cover all modifications, alternative constructions, combinations, and equivalents falling within the spirit and scope of the disclosure.

Figure 15A:
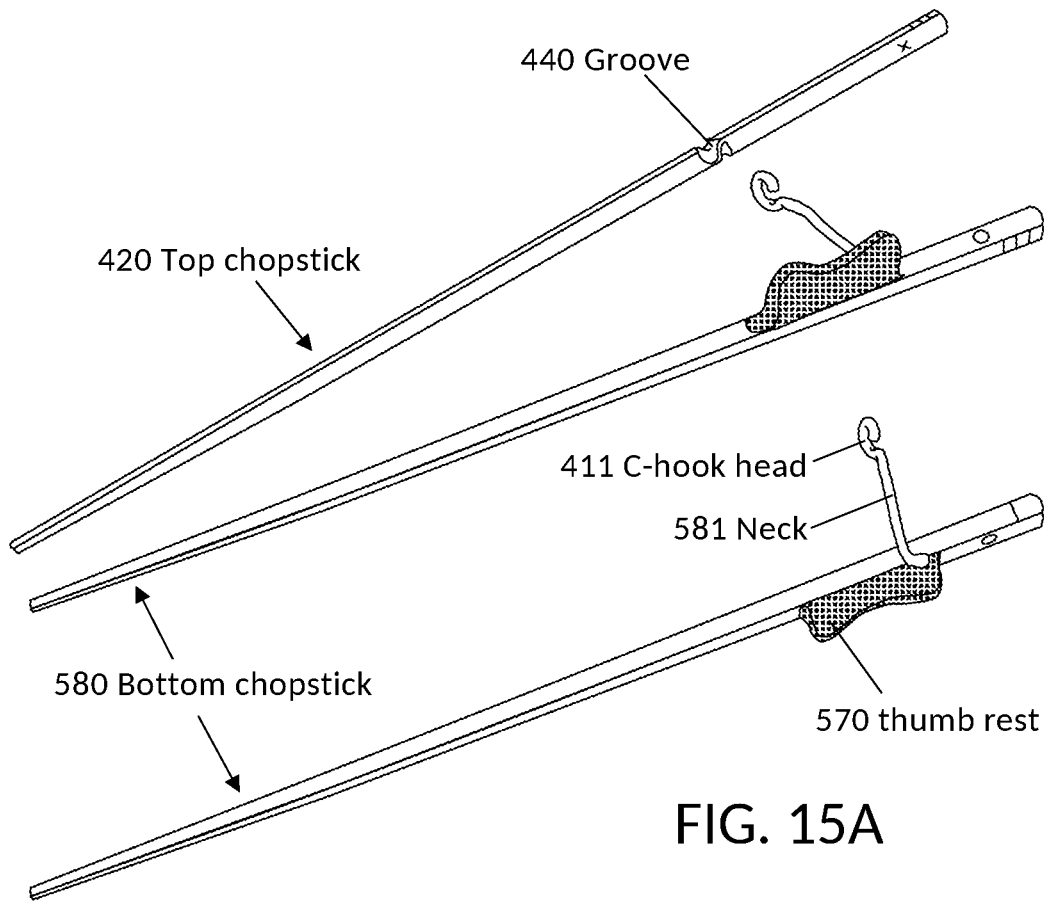
FIG. 15A shows the third embodiment which is derived from the second embodiment (FIG. 12), whereby the C-hook coupling bar is built permanently into the elevated thumb rest.

Additional embodiments may be derived from the second embodiment. For instance, the C-hook coupling bar may be built permanently into the elevated thumb rest of the second embodiment. This forms a third embodiment, shown in FIG. 15A. In the third embodiment the same top chopstick 420 and groove 440 are reused unmodified. The coupling bar, however, contains only C-hook head 411, and a modified neck 581. Neck 581 is built permanently into the same thumb rest 570, forming bottom chopstick 580 of the third embodiment.

Figure 15B:
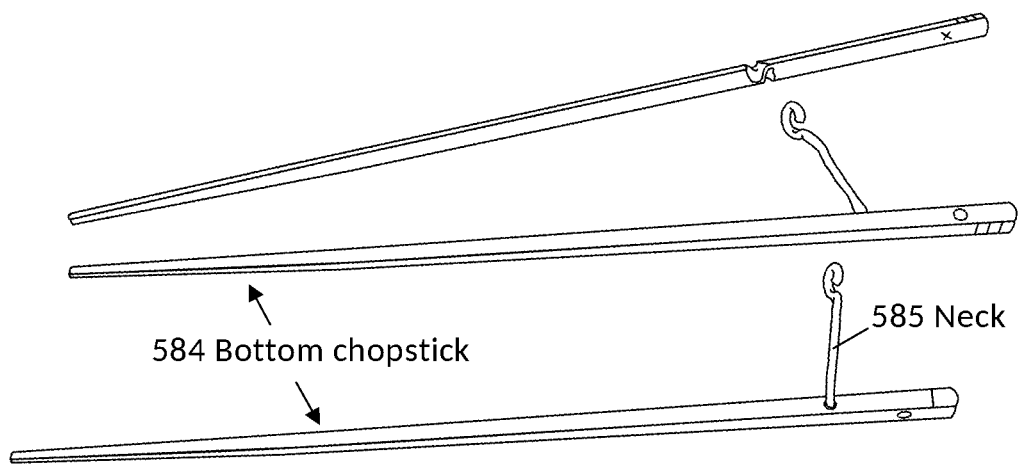
FIG. 15B shows the fourth embodiment which is derived from the first embodiment (FIG. 7), whereby the C-hook coupling bar is built permanently into the bottom chopstick.

Similarly, a fourth embodiment may be created from the first embodiment, shown in FIG. 15B, by building a modified neck 585 permanently into bottom chopstick 584 itself, instead of allowing the coupling bar to be a removable attachment with an extra body.

Figure 16:
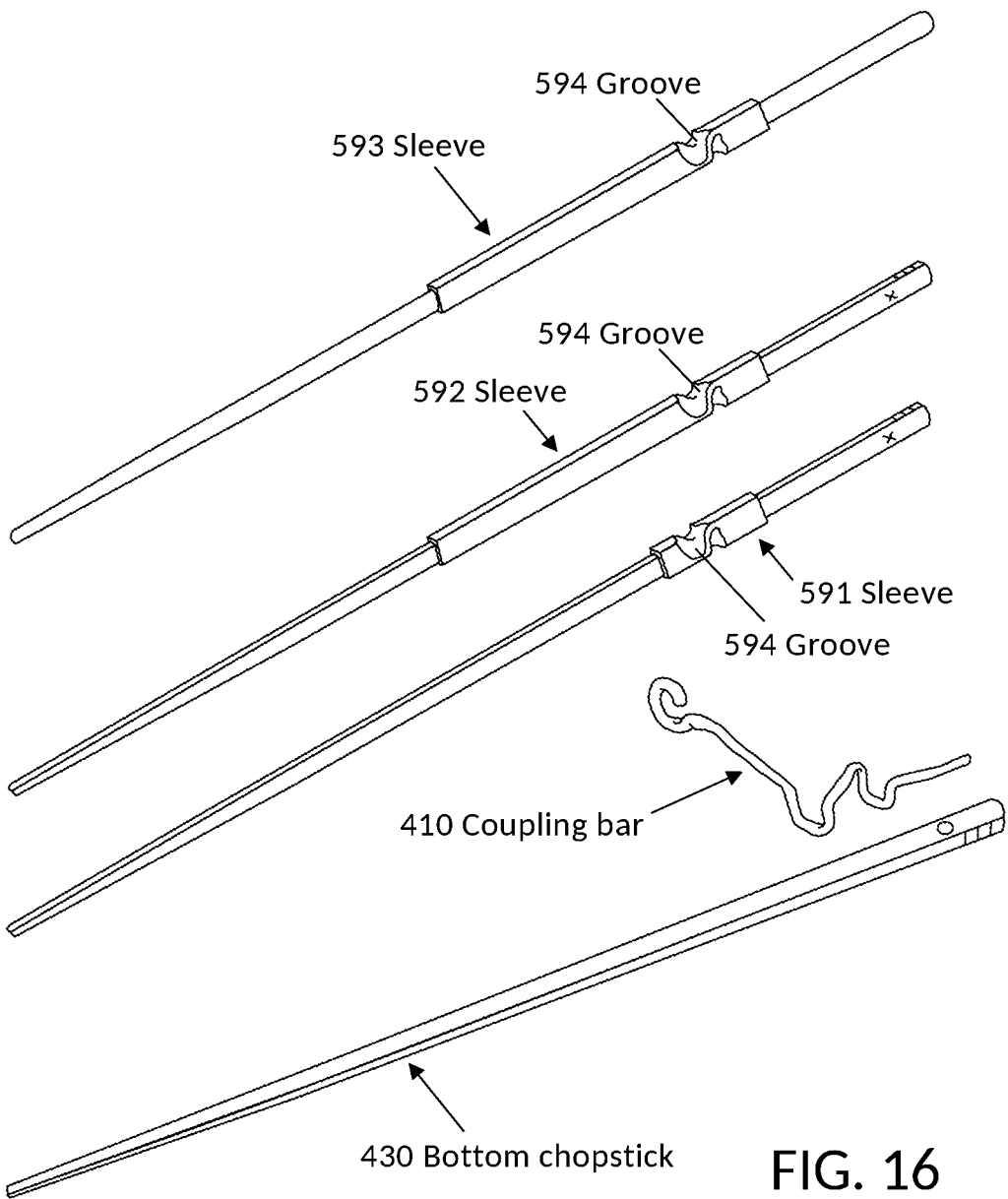
FIG. 16 illustrates the fifth, the sixth, and the seventh embodiments which are derived from the first embodiment (FIG. 7), whereby the groove is provided by a removable sleeve into which a plain top chopstick can be inserted.

FIG. 16 shows alternative embodiments where groove 594 is provided by a removable sleeve into which a plain top chopstick can be inserted, instead of the groove being carved into the top chopstick. Three such removable embodiments are shown in FIG. 16. The fifth embodiment comprises a short sleeve 591 for square chopsticks, where a user's fingers continue to grip the original chopstick surface. The sixth embodiment comprises a long sleeve 592 for square chopsticks, where a user's fingers grip surfaces of the sleeve instead. The seventh embodiment comprises a long sleeve for round chopsticks. In all three alternative embodiments, the same bottom chopstick 430 and coupling bar 410 are reused unmodified.

The placement of the coupling bar on the bottom chopstick may be tailored to personal tastes, to change the maximum pitch angle between chopsticks, regardless of whether the coupling bar is permanently or removably attached to the bottom chopstick. The placement of the groove on the top chopstick may be similarly tailored, regardless of the permanent or removable nature of the groove.

Figure 17W:
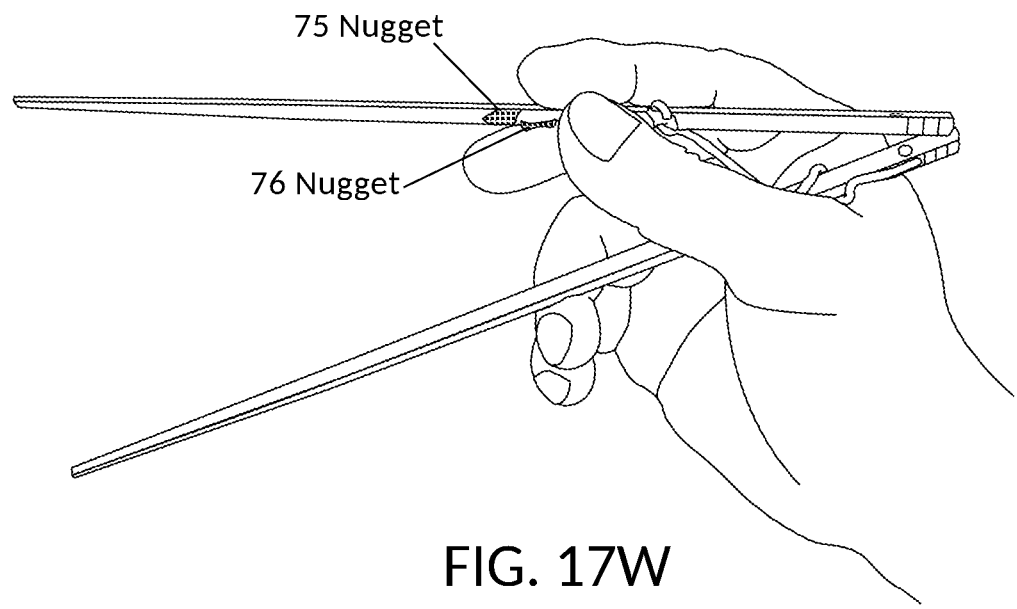
FIG. 17W is a view, at the wide-open posture, of the eighth embodiment created by combining training chopsticks from FIG. 1W with ergonomic nuggets from my '029 application.
Figure 17C:
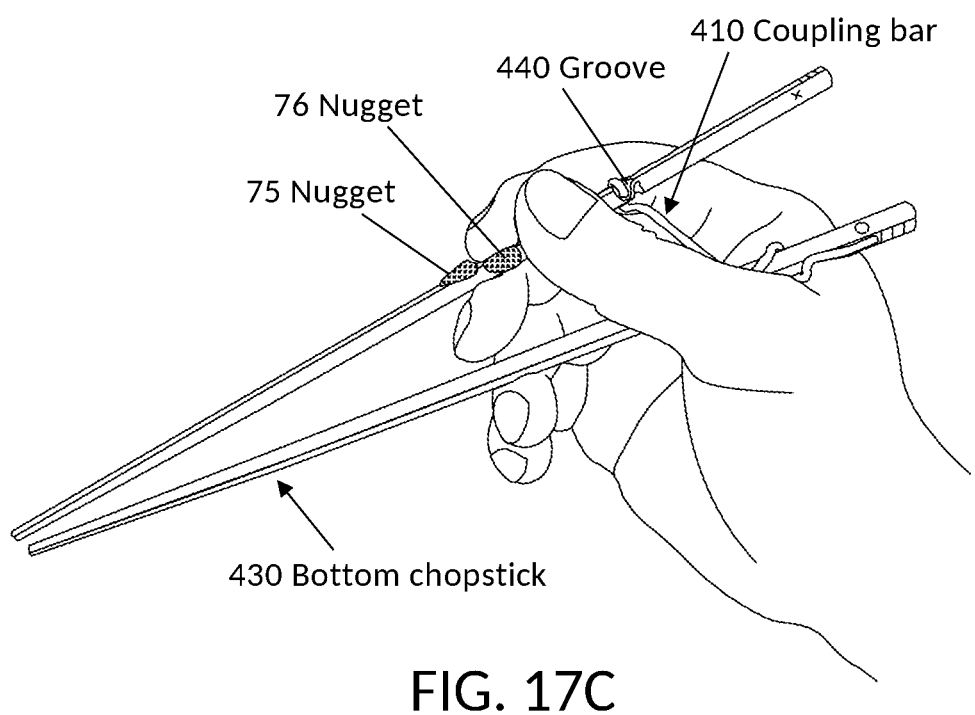
FIG. 17C is a view, at the closed posture, of the eighth embodiment created by combining training chopsticks from FIG. 1C with ergonomic nuggets from my '029 application.

Many embodiments of the prevent disclosure may be used in combination with ergonomic nuggets disclosed in my '029 application. For instance, the first embodiment of training chopsticks may be enhanced with top ergonomic nuggets, shown as the eighth embodiment in FIG. 17W and FIG. 17C. Two ergonomic nuggets from the '029 application, nugget 75 and nugget 76, are fixedly attached to the top chopstick with groove 440. The top chopstick is coupled with C-hook coupling bar 410 which is fixedly attached to bottom chopstick 430. This allows a learner to be assisted by both tactile feedback from ergonomic nuggets, and the pre-programmed planetary gear train motion of the top chopstick.

Furthermore, for all embodiments, names of fingers involved in wielding training chopsticks may be inscribed on surfaces that should be covered by these fingers at the closed posture, as an identification and placement aid for beginners.

Choices for plain chopsticks are not limited to square Japanese ones. Chinese style, hexagonal, octagonal, and even round chopsticks can be used as base models. Materials used for chopsticks and the coupling bar may vary, including wood, bamboo, plastic, flexible rubber, metal, and any nontoxic material. Training chopsticks may be cast from mold, milled from source materials, printed on 3D-printers, or otherwise produced. For all embodiments, further-derived forms can be produced to accommodate righthanded users, lefthanded users, children, adults, and other hand shapes or sizes in between.

CONCLUSION

Training chopsticks designed to address the unnatural thumb pose required by the standard grip have been described in this disclosure. They guide learners to focus first on mastering the twirling of chopsticks between the closed posture and the wide-open posture. Learners can acquire skills needed for moving fingers like planet gears in a planetary gear train, without having to simultaneously learn to secure chopsticks using the required thumb pose. Such thumb pose can be mastered later as a second step. Furthermore, a variation of training chopsticks provides an elevated thumb rest to accommodate learners suffering from anatomical limitations.

Training chopsticks in this disclosure achieve said assistance, while still retaining most aspects of unrestricted chopsticks, including: the correctness of the grip, the correctness of the twirling motion, the range of finger motions, the power generated by proper mechanical advantage, and the dexterity of both chopsticks. The same cannot be said of previously-published training devices.

Some factors differentiating training chopsticks from published devices include:
1. C-hook rotates within the circumferential groove along longitudinal axis, not lateral axis.
2. C-hook and groove are tailored to the alternating motion, not to a static finger posture.
3. Top chopstick follows pre-programmed twirling movement, not a simple lever action.
4. Rolls are enabled by the C-hook, not hindered by simple third-class Archimedean levers.
5. Fingers directly grip surfaces of plain chopsticks, not pads, hoops, or grooves.
6. Chopstick surfaces and finger skins mesh and roll together, not rub against one another.
7. Training chopsticks are operated exactly like plain chopsticks, not crutches.
8. Principles of the planetary gear train are honored, not hindered.
9. Dynamics and mechanical advantages of the standard grip are upheld, not weakened.

Benefits of training chopsticks have been disclosed, including:
1. They guide users to adopt the standard grip and its full range of alternating motion.
2. They allow users to extend tips of chopsticks wide apart.
3. They teach users how to twirl the top chopstick with its pre-programmed movements.
4. They allow users to learn chopstick twirling and chopstick holding as two separate steps.
5. They accommodate users with anatomical limitations w.r.t. the standard thumb pose.
6. They enable users to manipulate food items with dexterity.
7. They enable users to hold food items firmly with confidence.

I claim:
1. A pair of training chopsticks comprising:
a bottom chopstick;
a coupling bar;
said coupling bar having a head portion in the shape of a C-hook;
said coupling bar having a neck portion;
said neck portion being mounted on said bottom chopstick;
a top chopstick;
said top chopstick providing a circumferential groove around longitudinal axis of the top chopstick; and
said circumferential groove being capable of receiving said C-hook head.

2. The training chopsticks of claim 1 wherein said coupling bar is built permanently into said bottom chopstick.

3. The training chopsticks of claim 1 wherein said coupling bar is built as a removable attachment to said bottom chopstick.

4. The training chopsticks of claim 1 wherein said circumferential groove is formed in the shape of a spiral.

5. The training chopsticks of claim 1 further comprising:
a sleeve;
said sleeve being capable of receiving said top chopstick; and
said circumferential groove is provided on said sleeve.

6. The training chopsticks of claim 1 further comprising:
said coupling bar having a body portion, extending from said neck portion;
said body portion forming a square spiral shape; and
said body portion being capable of wrapping around said bottom chopstick, allowing said neck portion to be mounted on said bottom chopstick.

7. The training chopsticks of claim 1 further comprising:
an elevated thumb rest; and
said elevated thumb rest being mounted on said bottom chopstick.

8. The training chopsticks of claim 7 wherein said neck portion is mounted on said bottom chopstick via said elevated thumb rest.

9. The training chopsticks of claim 7 wherein said elevated thumb rest is built permanently into said bottom chopstick.

10. The training chopsticks of claim 7 wherein said elevated thumb rest is built as a removable attachment to said bottom chopstick.

* * * * *